United States Patent
Itou et al.

(10) Patent No.: US 6,319,165 B1
(45) Date of Patent: Nov. 20, 2001

(54) HYDRAULIC CONTROL DEVICE FOR AUTOMATIC TRANSMISSION

(75) Inventors: Masahiro Itou; Hideaki Ogasawara; Naoyuki Fukaya; Takenori Kanou, all of Anjo; Yoshihiro Iijima, Toyota, all of (JP)

(73) Assignees: Aisin AW Co., Ltd., Anjo; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/450,639

(22) Filed: Nov. 29, 1999

(30) Foreign Application Priority Data

Dec. 1, 1998 (JP) .................................................. 10-342007
Dec. 1, 1998 (JP) .................................................. 10-342008

(51) Int. Cl.$^7$ .................................................. F16H 61/12
(52) U.S. Cl. ........................ 475/119; 475/121; 475/128
(58) Field of Search ............................ 477/906; 475/119, 475/121, 128

(56) References Cited

U.S. PATENT DOCUMENTS

| | | |
|---|---|---|
| 4,494,423 | 1/1985 | McCarthy et al. . |
| 4,527,448 | 7/1985 | Person et al. . |
| 4,541,308 | 9/1985 | Person et al. . |
| 4,628,771 | 12/1986 | Person et al. . |
| 4,903,551 | 2/1990 | Hiramatsu et al. . |
| 5,010,786 | 4/1991 | Hiramatsu et al. . |
| 5,193,417 | * 3/1993 | Niiyama et al. ...................... 477/155 |
| 5,538,479 | 7/1996 | Niiyama ............................... 475/128 |
| 5,919,108 | * 7/1999 | Takagi .................................. 475/128 |
| 6,024,671 | * 2/2000 | Sawa et al. .......................... 477/906 |

FOREIGN PATENT DOCUMENTS

A-9-303545  11/1997  (JP) .

* cited by examiner

*Primary Examiner*—Sherry Estremsky
(74) *Attorney, Agent, or Firm*—Oliff & Berridge, PLC

(57) ABSTRACT

A hydraulic control device for an automatic transmission that can ensure power transmission when a failure occurs to the solenoid valve of the hydraulic control device, the hydraulic control device having a plurality of hydraulic servos for engaging and disengaging a plurality of friction engagement elements in accordance with the supply and discharge of a hydraulic pressure so as to prevent interlock from occurring to the transmission, a solenoid valve for generating a predetermined hydraulic pressure and supplying the predetermined hydraulic pressure to a hydraulic servo selected in correspondence with a target gear ratio and fail-safe means for supplying fail-safe hydraulic pressure to at least two hydraulic servos selected to attain an arbitrary gear ratio when a failure occurs to the solenoid valve and power transmission thereby becomes impossible. Further, the hydraulic control device has a plurality of solenoid valves for supplying the predetermined hydraulic pressure to the plurality of hydraulic servos and a shutoff valve, disposed between a hydraulic pressure source and one of the solenoid valves, for shutting off supply of hydraulic pressure to that one solenoid valve when hydraulic pressure to be supplied to the hydraulic servos selected in correspondence with the target gear ratio and hydraulic pressure to be supplied to the other hydraulic servos are generated.

18 Claims, 8 Drawing Sheets

FIG. 3

| SHIFT POSITION | | SOLENOID | | | | | | CLUTCH | | | | BRAKE | | | OWC | |
|---|---|---|---|---|---|---|---|---|---|---|---|---|---|---|---|---|
| | | S4 | S5 | DSL | SL1 | SL2 | SL3 | C0 | C1 | C2 | C3 | B1 | B2 | B3 | F1 | F2 |
| P | | × | × | × | ○ | ○ | ○ | × | × | × | × | × | × | ○ | × | × |
| R | | × | × | × | ○ | ○ | ○ | × | × | ○ | × | × | ○ | ○ | × | × |
| R(INHIBIT) | | × | × | ○ | ○ | ○ | ○ | × | × | × | × | × | × | ○ | × | × |
| N | | × | × | × | ○ | ○ | ○ | × | × | × | × | × | × | ○ | × | × |
| D | 1st | × | × | × | ○ | ○ | × | × | ○ | × | × | × | × | ○ | ○ | ○ |
| D | 2nd | × | × | × | × | ○ | × | × | ⊙ | × | × | ○ | × | ○ | × | ○ |
| D | 3rd | × | ○ | ● | ○ | ● | × | ○ | ○ | × | × | × | × | ○ | × | ○ |
| D | 4th | × | ○ | ● | × | ● | ○ | ○ | × | × | ○ | × | ○ | × | ○ |
| D | 5th | ○ | ○ | ● | × | ● | ○ | ○ | × | × | ○ | ○ | × | × | × | × |
| 3 | 1st | × | × | × | ○ | ○ | × | × | ○ | × | × | × | × | ○ | ○ | ○ |
| 3 | 2nd | × | × | × | × | ○ | × | × | ○ | × | × | ○ | × | ○ | × | ○ |
| 3 | 3rd | × | ○ | ● | ○ | ● | × | ○ | ○ | × | × | × | × | ○ | × | ○ |
| 3 | 4th | × | ○ | ● | × | ● | ○ | ○ | × | × | × | ○ | × | ○ | × | ○ |
| 2 | 1st | × | × | × | ○ | ○ | × | × | ○ | × | × | × | × | ○ | ○ | ○ |
| 2 | 2nd | × | × | × | × | ○ | × | × | ○ | × | × | ○ | × | ○ | × | ○ |
| 2 | 3rd | × | ○ | ● | ○ | ● | × | ○ | ○ | × | × | × | × | ○ | × | ○ |
| L | 1st | × | × | ○ | ○ | ○ | × | × | ○ | × | × | × | ○ | ○ | ○ | ○ |
| L | 2nd | × | × | × | × | ○ | × | × | ○ | × | × | ○ | × | ○ | × | ○ |
| 2-3 GEAR SHIFT FAIL | | × | ×-○ | × | ×-○ | ○-× | × | ×-○ | ○ | × | × | ○-× | × | ○ | × | ○ |
| | 3rd | × | × | × | × | × | × | ○ | ○ | × | × | × | × | ○ | × | ○ |

| REMARKS | | | | |
|---|---|---|---|---|
| ○ | ON | | ENGAGEMENT | LOCK |
| × | OFF | | DISENGAGEMENT | FREE |
| ● | ON:L-UP ON OFF:L-UP OFF | | — | — |

HYDRAULIC CONTROL DEVICE FOR AUTOMATIC TRANSMISSION

BACKGROUND OF THE INVENTION

1. Field of Invention

The invention relates to a hydraulic control device for an automatic transmission.

2. Description of Related Art

Conventionally, an automatic transmission used for a vehicle, such as an automobile, comprises a transmission having a planetary gear unit and the like. The transmission comprises a plurality of friction engagement elements, such as clutches and brakes. By engaging or disengaging predetermined combinations of the frictional engagement elements, rotations are selectively outputted from gear elements, such as a sun gear, a ring gear and a carrier of the planetary gear unit, and a plurality of transmission gear ratios are realized.

The friction engagement elements are engaged or disengaged by actuating the hydraulic servo of a hydraulic circuit. The hydraulic servo is provided with a hydraulic servo drum having an outer peripheral wall and an inner peripheral wall, an annular piston slidably fitted into the hydraulic servo drum and the like. The annular piston is moved by supplying or discharging oil to/from an apply oil chamber formed between the hydraulic servo drum and the annular piston, whereby the friction engagement elements disposed to face the annular piston are engaged or disengaged.

Also, the hydraulic circuit is provided with various types of solenoid valves, switching valves and the like. If the solenoid of a predetermined solenoid valve is energized, a predetermined switching valve is switched and hydraulic pressure is thereby supplied to the hydraulic servo connected to the switching valve.

In the automatic transmission structured as described above, if a certain gear ratio is to be attained, one or more predetermined friction engagement elements are engaged. At this time, if a failure (abnormality) occurs to a solenoid valve and a frictional engagement element which should not be engaged is engaged, then interlock occurs to the transmission.

To avoid this, there is provided a hydraulic control device for preventing interlock from occurring to the transmission such that if hydraulic pressure is supplied to the hydraulic servo of the frictional engagement element which should not be engaged, then the hydraulic pressure allows a predetermined switching valve to be switched, supply of hydraulic pressure to the hydraulic servo of a predetermined frictional engagement element is stopped (see U.S. Pat. No. 4,903, 551).

In the above-stated conventional automatic transmission, however, if a friction engagement element, which does not need to be engaged, is engaged, i.e., failure (onfail) occurs while hydraulic pressure is being supplied to the solenoid valve, it is possible to prevent interlock from occurring to the transmission. However, if a friction engagement element, which needs to be engaged, is not engaged, i.e., failure (off-fail) occurs while no hydraulic pressure is supplied to the solenoid valve, then the automatic transmission is shifted to neutral and sometimes cannot transmit power, with the result that the vehicle cannot travel.

Furthermore, in the conventional hydraulic control device for an automatic transmission, the switching valve is provided between a solenoid valve and a hydraulic servo. Due to this, oil leaks between the spool of the switching valve and the valve body thereof and further a valve provided between the solenoid valve and the hydraulic servo generates line resistance. If so, a predetermined hydraulic pressure cannot be supplied to the hydraulic servo. Due to this, if transient control, i.e., direct control of the engagement/ disengagement of friction engagement elements by the actuation of solenoid valves is conducted, the accuracy of supply/discharge of hydraulic pressure to the hydraulic servo cannot be enhanced, thereby generating transmission shock.

To avoid this disadvantage, it may be considered to control the energization of a solenoid according to the oil leakage amount. The oil leakage amount, however, varies with the change of the valve body with the passage of time. Owing to this, as time passes, the accuracy of supply/ discharge of hydraulic pressure to the hydraulic servo deteriorates.

SUMMARY OF THE INVENTION

To overcome the above described disadvantages of the related art, it is, therefore, an object of the invention to provide a hydraulic control device for an automatic transmission which can ensure transmission of power and the travel of the vehicle when failure occurs to a solenoid valve.

It is, therefore, another object of the invention to provide a hydraulic control device for an automatic transmission capable of preventing the occurrence of interlock to the transmission, enhancing the accuracy of supplying/ discharging hydraulic pressure to/from the hydraulic servo and thereby preventing the occurrence of transmission shock.

According to the invention, a hydraulic control device for an automatic transmission comprises a plurality of friction engagement elements; a plurality of hydraulic servos for engaging and disengaging the friction engagement elements, respectively in accordance with a supply and discharge of hydraulic pressure; a solenoid valve for generating predetermined hydraulic pressure and supplying the predetermined hydraulic pressure to a hydraulic servo selected in correspondence with a target gear ratio; and fail-safe means for supplying fail-safe hydraulic pressure to at least two hydraulic servos selected to attain an arbitrary gear ratio when a failure occurs to the solenoid valve and power transmission becomes impossible. In this case, when failure occurs to the solenoid valve and power transmission becomes thereby impossible, at least two hydraulic servos are selected to attain an arbitrary gear ratio and fail-safe hydraulic pressure is supplied to the selected hydraulic servos. It is, therefore, possible to ensure that the automatic transmission can transmit power and to thereby allow travel of a vehicle.

Another hydraulic control device for an automatic transmission according to the invention further comprises a shutoff valve for shutting off the supply of hydraulic pressure to at least one of the hydraulic servos when the hydraulic pressure is generated to be supplied to the hydraulic servos other than the hydraulic servos selected in correspondence with the target gear ratio. In this case, all of the friction engagement elements corresponding to the hydraulic servos are not engaged, so that it is possible to prevent interlock from occurring to the transmission.

Yet another hydraulic control device for an automatic transmission according to the invention further comprises a shutoff valve for shutting off the supply of hydraulic pressure to at least one of the hydraulic servos when hydraulic pressure is generated to be supplied to the hydraulic servos other than a hydraulic servo selected to effect engine brake. In this case, all of the friction engagement elements corresponding to the hydraulic servos are not engaged, so that it is possible to prevent interlock from occurring to the transmission.

In yet another hydraulic control device for an automatic transmission according to the invention, the shutoff valve is disposed upstream of the solenoid in an oil passage. In this case, since the oil leakage amount between the solenoid and the hydraulic servo can be reduced and line resistance can be reduced, it is possible to enhance the control characteristics of the solenoid.

In yet another hydraulic control device for an automatic transmission, the shutoff valve further comprises two spools.

Another hydraulic control device for an automatic transmission according to the invention comprises a plurality of friction engagement elements; a plurality of hydraulic servos for engaging and disengaging the friction engagement elements, respectively in accordance with supply and discharge of hydraulic pressure; a hydraulic pressure source; a plurality of solenoid valves for generating predetermined hydraulic pressure upon receiving hydraulic pressure from the hydraulic pressure source and for supplying the predetermined hydraulic pressure to the hydraulic servos; and a shutoff valve, disposed between the hydraulic pressure source and one of the solenoid valves, for shutting off supply of hydraulic pressure to the one solenoid valve when hydraulic pressure to be supplied to a hydraulic servo selected in correspondence with a target gear ratio and hydraulic pressure to be supplied to other hydraulic servos are generated. In this case, when hydraulic pressure to be supplied to the hydraulic servos selected in correspondence with the target gear ratio and that to be supplied to the other hydraulic servos are generated, supply of hydraulic pressure to the solenoid valve is shut off. It is, therefore, possible to prevent interlock from occurring to the transmission. In addition, because the shutoff valve is disposed between the hydraulic pressure source and the solenoid valve, not only can the oil leakage amount between the solenoid valve and the hydraulic servo be reduced but also the line resistance can be reduced compared with a case where the shutoff valve is disposed downstream of the solenoid valve. Thus, if the function engagement elements are directly controlled by actuating the solenoid valve, it is possible to enhance the accuracy of supplying/discharging hydraulic pressure to the hydraulic servos and to thereby prevent transmission shock from occurring. Furthermore, since supply of hydraulic pressure to only one solenoid valve is shut off, it is possible to attain a predetermined gear ratio without increasing the number of oil passages.

In another hydraulic control device for the automatic transmission according to the invention, the shutoff valve is placed at an apply position for supplying the predetermined hydraulic pressure to the selected hydraulic servo and a shutoff position for shutting off supply of hydraulic pressure to the solenoid valves; when the shutoff valve is placed at the apply position, opposite hydraulic pressure formed to oppose hydraulic pressure to be supplied to the other hydraulic servo is supplied to a control oil chamber; when the shutoff valve is placed at the shutoff position, the supply of the opposite hydraulic pressure to the control oil chamber is shut off. In this case, since supply of hydraulic pressure to the control oil chamber is stopped at the shutoff position, hydraulic pressure for urging the spools against the apply position side is lost. Thus, the shutoff valve is placed at the shutoff position in a stable manner and no hunting occurs. Besides, it is not necessary to form a special oil passage to place the shutoff valve at the shutoff position.

In yet another hydraulic control device for an automatic transmission according to the invention, the other hydraulic servos are hydraulic servos of friction engagement elements generating interlock if the friction engagement elements are to be engaged simultaneously with a friction engagement element of the hydraulic servo selected in correspondence with the target gear ratio. In this case, the number of oil passages can be reduced by one, so that the hydraulic circuit can be simplified.

In yet another hydraulic control device for an automatic transmission according to the invention, an oil passage for controlling the opposite hydraulic pressure is communicated with an oil passage for communicating the shutoff valve with the one solenoid valve. In this case, compared with a case where opposite hydraulic pressure is supplied from the upstream of the shutoff valve, the number of oil passages can be reduced by one, so that the hydraulic circuit can be simplified.

In yet another hydraulic control device for the automatic transmission according to the invention, the shutoff valve is an apply control valve for supplying hydraulic pressure to a hydraulic servo of a first brake and a second apply control valve for supplying hydraulic pressure to a hydraulic servo of a second brake; the second apply control valve is placed at an apply position for supplying the predetermined hydraulic pressure to a selected hydraulic servo when hydraulic pressure is supplied only to the hydraulic servo of the first brake, when hydraulic pressure is supplied only to the hydraulic servo of the second brake, when hydraulic pressure is supplied only to a hydraulic servo of a predetermined clutch and when hydraulic pressure is supplied only to the hydraulic servo of the first brake and the hydraulic servo of the predetermined clutch.

If no hydraulic pressure is supplied to the hydraulic servo of the second brake, the shutoff valve cannot be placed at the shutoff position only by supplying the hydraulic servos of the first brake and that of the predetermined clutch with hydraulic pressure. Thus, it is possible to always generate hydraulic pressure supplied to the second brake while the shutoff valve is placed at the apply position. Therefore, if it is necessary to effect the first-speed engine brake by shifting to a low range, the second brake can be engaged.

BRIEF DESCRIPTION OF THE DRAWINGS

The invention will be described with reference to the drawings, in which:

FIG. 3 is an operation table of the automatic transmission in the first embodiment according to the invention;

DETAILED DESCRIPTION OF PREFERRED EMBODIMENTS

Now, the embodiments of the invention will be described in detail with reference to the accompanying drawings.

Figure 2:
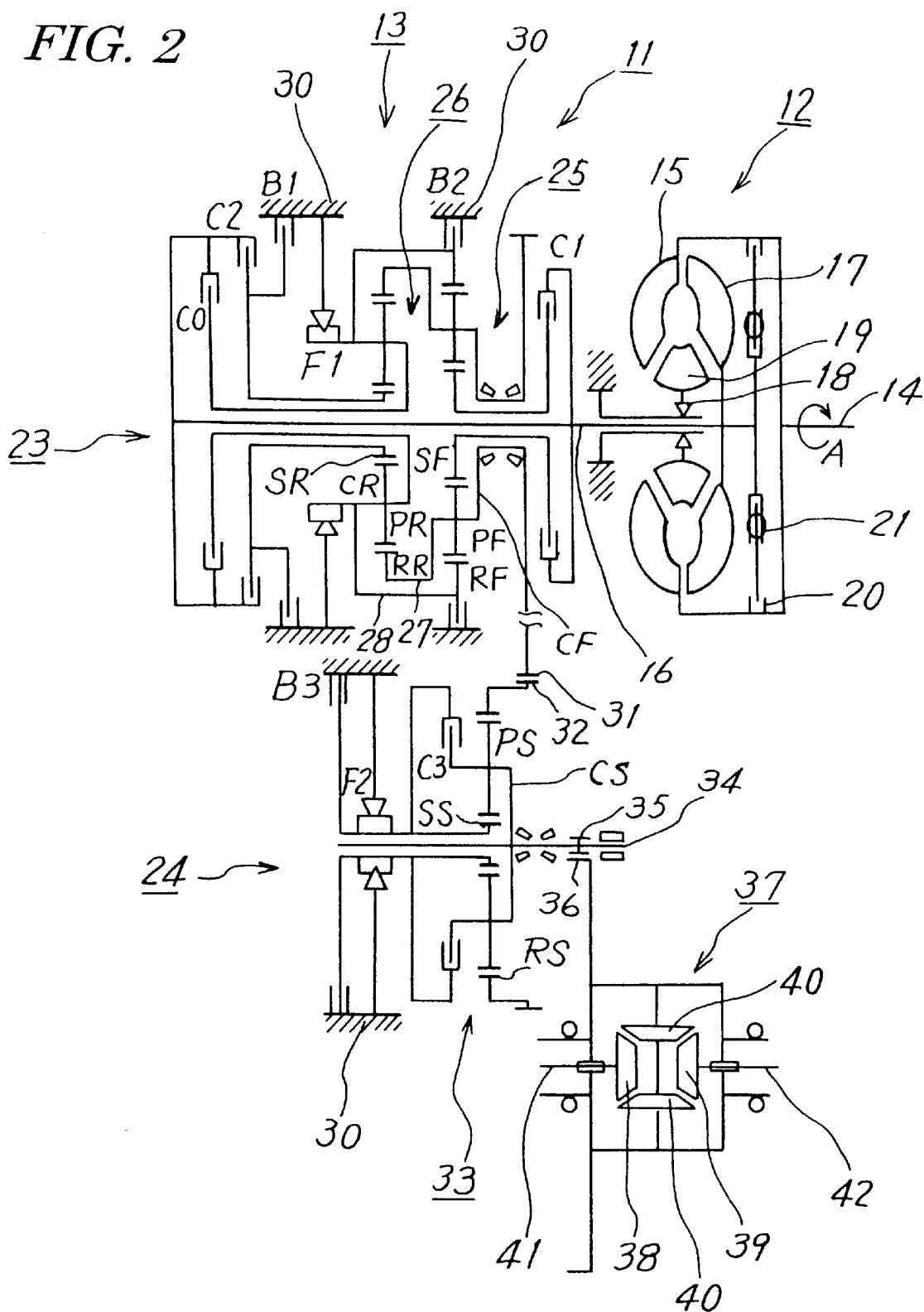
FIG. 2 is a conceptual view of an automatic transmission in the first embodiment according to the invention.

FIG. 2 is a conceptual view of an automatic transmission in a first embodiment according to the invention. FIG. 3 is an operation table of the automatic transmission in the first embodiment according to the invention.

In FIG. 2, reference symbol 11 denotes an automatic transmission. The automatic transmission 11 comprises, as gear elements, a front planetary gear unit 25, a rear planetary gear unit 26 and a planetary gear unit 33 and also comprises, as friction engagement elements, a first clutch C1, a second clutch C2, a third clutch C3, a fourth clutch C0, a first brake B1, a second brake B2 and a third brake B3.

Reference symbol 12 denotes a torque converter transmitting rotation in the direction of an arrow A generated by driving an engine which is not shown to the automatic transmission 11. Reference symbol 13 denotes a transmission for changing and outputting the speed of the rotation transmitted from the torque converter 12. The torque converter 12 consists of a pump impeller 15 coupled with an output shaft 14, of the engine, to which engine rotation is outputted, a turbine runner 17 coupled with an input shaft 16 through which rotation is inputted to the transmission 13, a stator 19 attached onto a one-way clutch 18, a lock-up clutch 20 locking when predetermined conditions are satisfied and coupling the output shaft 14 to the input shaft 16, a damper 21 and the like.

The transmission 13 consists of a main transmission 23 and a sub-transmission 24. The main transmission 23 has the front planetary gear unit 25 and the rear planetary gear unit 26. The front planetary gear unit 25 consists of a sun gear SF, a ring gear RF disposed concentrically with the sun gear SF, a pinion PF geared with the sun gear SF and the ring gear RF and a carrier CF rotatably supporting the pinion PF. The rear planetary gear unit 26 consists of a sun gear SR, a ring gear RR disposed concentrically with the sun gear SR, a pinion PR geared with the sun gear SR and the ring gear RR and a carrier CR rotatably supporting the pinion PR.

The carrier CF and the ring gear RR are coupled with each other by a coupling element 27 and the carrier CR and the ring gear RF are coupled with each other by a coupling element 28. The sun gear SF and the input shaft 16, and the ring gear RF and an automatic transmission case 30 are selectively coupled with each other through the first clutch C1 and through the second brake B2 and a first one-way clutch F1 provided parallel to each other, respectively, and the carrier CF and a counter drive gear 31 are coupled with each other. Further, the sun gear SR and the input shaft 16, the sun gear SR and the automatic transmission case 30, the carrier CR and the input shaft 16, and the carrier CR and the automatic transmission case 30 are selectively coupled with each other through the second clutch C2, through the first brake B1, through the fourth clutch C0 and through the second brake B2 and the first one-way clutch F1 provided parallel to each other, respectively.

The sub-transmission 24 comprises a planetary gear unit 33. The planetary gear unit 33 consists of a sun gear SS, a ring gear RS provided concentrically with the sun gear SS, a pinion PS geared with the sun gear SS and the ring gear RS and a carrier CS rotatably supporting the pinion PS. The sun gear SS and the automatic transmission case 30, and the sun gear SS and the carrier CS are selectively coupled with each other through the third brake B3 and a second one-way clutch F2 provided parallel to each other and through the third clutch C3, respectively, and the ring gear RS and a counter driven gear 32 are coupled with each other.

Furthermore, the counter drive gear 31 and the counter driven gear 32 are geared with each other to thereby allow the rotation of the main transmission 23 to be transmitted to the sub-transmission 24. The carrier CS is coupled to a counter shaft 34. An output gear 35 fixed to the counter shaft 34 is geared with a large ring gear 36 of a differential device 37. The differential device 37 is provided with left and right side gears 38, 39, and with a pinion 40 geared with both of the side gears 38, 39, and divides and transmits the rotation transmitted through the large ring gear 36 to drive shafts 41, 42.

An outer race, which is not shown, of the one-way clutch F1 is fixed to the automatic transmission case 30 and when an inner race, which is not shown, rotates together with the carrier CR in the same direction (forward direction) as the arrow A direction, the one-way clutch F1 becomes free. When the inner race rotates in the opposite direction (backward direction) to the arrow A direction, the one-way clutch F1 is locked. Additionally, an outer race of the second one-way clutch F2 is fixed to the automatic transmission case 30 and when an inner race rotates together with the sun gear SS in the forward direction, the second one-way clutch F2 is locked. When the inner race rotates in the opposite direction, the second one-way clutch F2 becomes free.

Next, the operation of the automatic transmission 11 structured as described above will be described.

In FIG. 3, reference symbols SL1 to SL3 denote first to third solenoid valves of normally open type, respectively, S4 and S5 denotes fourth and fifth solenoid valves of normally closed type, respectively, DSL denotes a sixth solenoid valve of normally closed type, C1 denotes the first clutch, C2 denotes the second clutch, C3 denotes the third clutch, C0 denotes the fourth clutch, B1 denotes the first brake, B2 denotes the second brake, B3 denotes the third brake, F1 denotes the first one-way clutch (OWC) and F2 denotes the second one-way clutch.

As shift positions, symbol P denotes a parking range, R denotes a reverse range, N denotes a neutral range, D denotes a forward range, 3 denotes a third range, 2 denotes a second range, L denotes a low range, 1st denotes a first speed, 2nd denotes a second speed, 3rd denotes a third speed, 4th denotes a fourth speed and 5th denotes a fifth speed.

Further, symbol O indicates an on (energized) state for the first to third solenoid valves SL1 to SL3, the fourth and fifth solenoid valves S4 and S5 and the sixth solenoid valve DSL, indicates an engaged state for the first clutch C1, the second clutch C2, the third clutch C3, the fourth clutch C0, the first brake B1, the second brake B2 and the third brake B3, and indicates a locked state for the first and second one-way clutches F1 and F2. Symbol X indicates an off (de-energized) state for the first to third solenoid valves SL1 to SL3, the fourth and fifth solenoid valves S4 and S5 and the sixth solenoid valve DSL, indicates an disengaged state for the first clutch C1, the second clutch C2, the third clutch C3, the fourth clutch C0, the first brake B1, the second brake B2 and the third brake B3, and indicates a free state for the first and second one-way clutches F1 and F2. Symbol ⊚ indicates an on state when the lock-up clutch 20 (FIG. 2) is engaged (L-UP ON) and an off state when the lockup clutch 20 is disengaged (L-UP OFF).

At the first speed in the forward range D, the first clutch C1 and the third brake B3 are engaged. In this case, the main transmission 23 transmits the engine rotation (in forward direction) transmitted to the input shaft 16, to the sun gear SF through the first clutch C1. Since the sun gear SF and the pinion PF are geared with each other, the sun gear SF urges the carrier CF to rotate in forward direction. The carrier CF is, however, coupled to the driving wheels 41, 42 through the counter drive gear 31 and the sub-transmission 24, so that reaction occurs. As a result, the ring gear RF is urged to rotate in the opposite direction. The ring gear RF is, however, coupled to the first one-way clutch F1 through the coupling element 28, so that rotation in the opposite direction is prevented. Accordingly, the reduced-speed rotation in forward direction is outputted from the carrier CF and transmitted to the sub-transmission 24 through the counter drive gear 31.

In the sub-transmission 24, the ring gear RS is rotated in the opposite direction following the rotation of the counter driven gear 32 in the opposite direction by the rotation of the counter drive gear 31. Following the rotation of the ring gear RS, the sun gear SS is to rotate in the forward direction. The sun gear SS is, however, coupled to the second one-way clutch F2, so that the rotation of the sun gear SS in the forward direction is prevented. As a result, the sub-transmission 24 is placed in an under-drive state, and the first-speed rotation is outputted from the carrier CS and transmitted to the differential device 37 through the output gear 35.

In addition, at the second speed in the forward range D, the first clutch C1, the first brake B1 and the third brake B3 are engaged. In this case, in the main transmission 23, the sun gear SR is fixed following the engagement of the first brake B1. As a result, the reduced-speed rotation is outputted from the carrier CF and transmitted to the sub-transmission 24 through the counter drive gear 31.

Then, the sub-transmission 24 is placed in an under-drive state, and the second-speed rotation in the forward direction is outputted from the carrier CS and transmitted to the differential device 37 through the output gear 35.

Further, at the third speed in the forward range D, the first clutch C1, the fourth clutch C0 and the third brake B3 are engaged. In this case, in the main transmission 23, following the engagement of the first clutch C1 and the fourth clutch C0, the front planetary gear unit 25 is directly coupled to the rear planetary gear unit 26 and a rotation having the same rotation speed as that of the engine in forward direction is outputted from the carrier CF and transmitted to the sub-transmission 24 through the counter drive gear 31.

Thereafter, the sub-transmission 24 is placed in an under-drive state and the third-speed rotation in the forward direction is outputted from the carrier CS and transmitted to the differential device 37 through the output gear 35.

At the fourth speed in the forward range D, the fourth clutch C0, the first brake B1 and the third brake B3 are engaged. In this case, the sun gear SR is fixed and the rotation having the same rotation speed as that of the engine is transmitted to the carrier CR through the fourth clutch C0. Thus, the accelerated rotation is outputted from the ring gear RR and the carrier gear CF and transmitted to the sub-transmission 24 through the counter drive gear 31.

Then, the sub-transmission 24 is placed in an under-drive state and the fourth-speed rotation in forward direction is outputted from the carrier CS and transmitted to the differential device 37 through the output gear 35.

Further, at the fifth speed in the forward range D, the third clutch C3, the fourth clutch C0 and the first brake B1 are engaged. In this case, in the main transmission 23, the sun gear SR is fixed and a rotation of the same rotation speed as that of the engine in the forward direction is transmitted to the carrier CR through the fourth clutch C0. Thus, the accelerated rotation is outputted from the ring gear RR and the carrier CF and transmitted to the sub-transmission 24 through the counter drive gear 31.

The sub-transmission 24 is placed in an over-drive state and the planetary gear unit 33 is placed in a direct coupled state following the engagement of the third clutch C3. Then, the fifth-speed rotation in the forward direction is outputted from the carrier CS through the counter drive gear and transmitted to the differential device 37 through the output gear 35.

Next, the hydraulic circuit of the automatic transmission 11 will be described.

Figure 1:
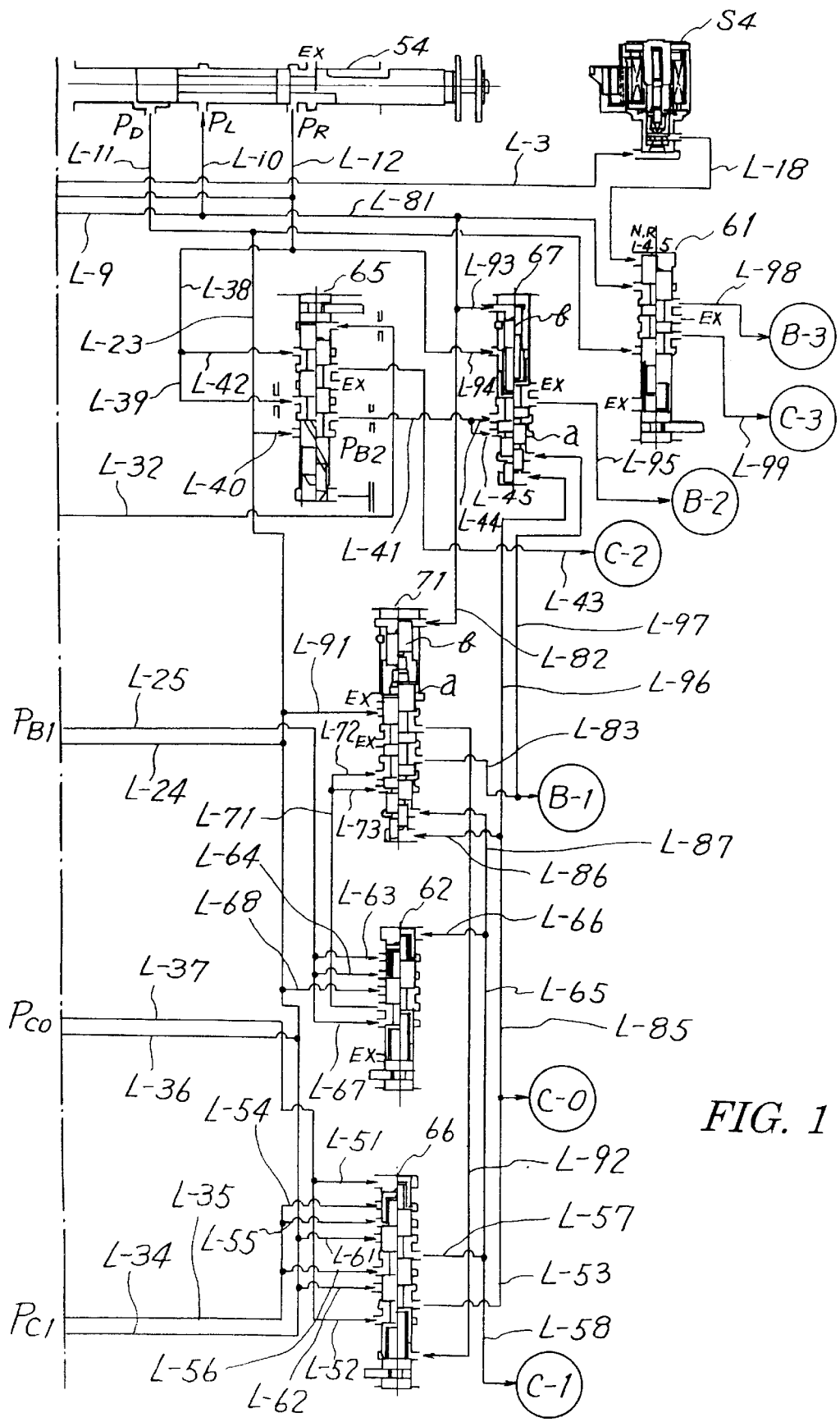
FIG. 1 is a right half view showing a hydraulic circuit in the first embodiment according to the invention.
Figure 4:
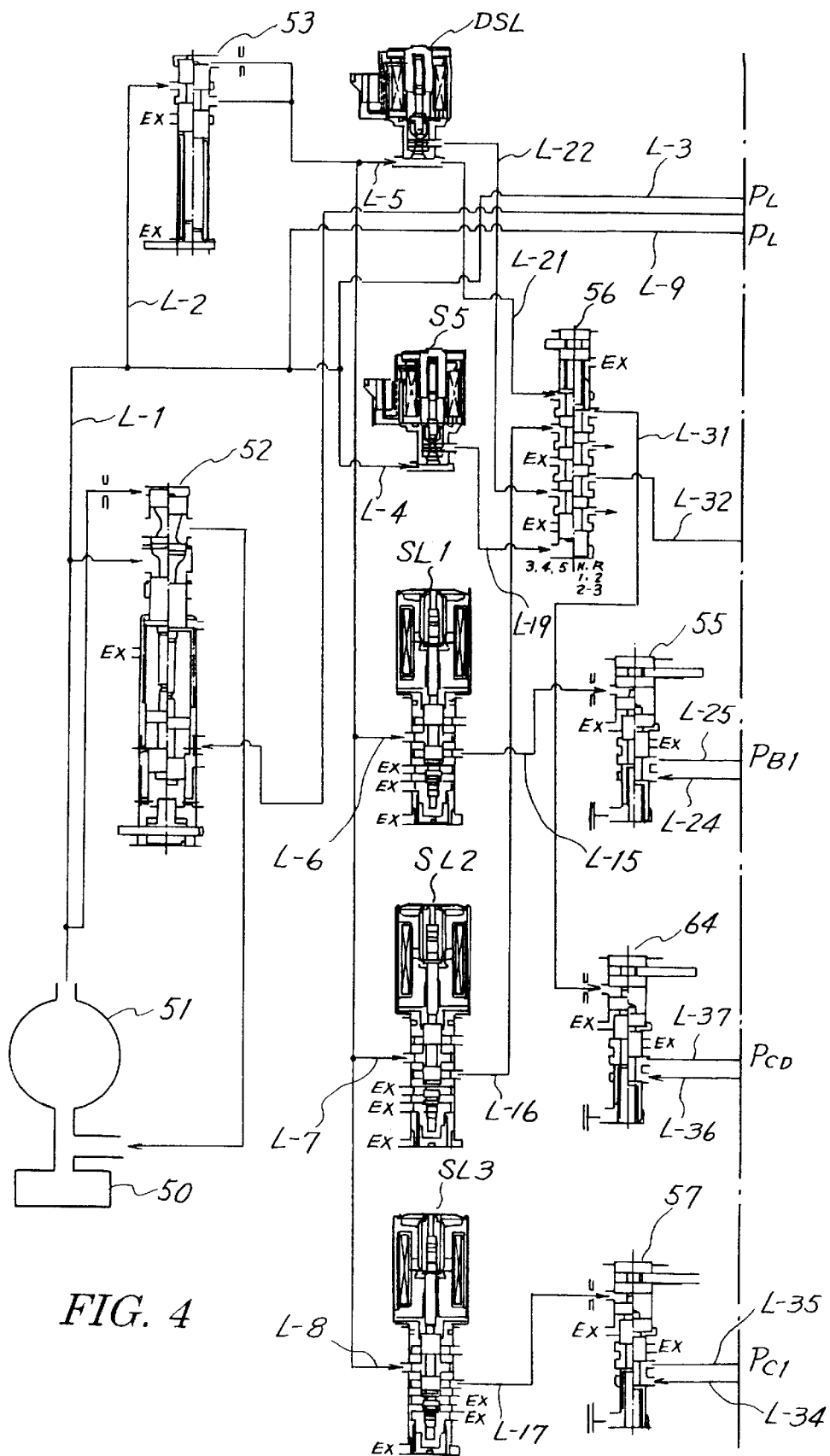
FIG. 4 is a left half view showing the hydraulic circuit in the first embodiment according to the invention.

FIG. 1 is a right half view showing the hydraulic circuit in the first embodiment according to the invention and FIG. 4 is a left half view showing the hydraulic circuit in the first embodiment according to the invention.

In FIGS. 1 and 4, reference symbols C-1, C-2, C-3, C-0, B-1, B-2 and B-3 denote the hydraulic servos for engaging/disengaging the first clutch C1, the second clutch C2, the third clutch C3, the fourth clutch C0, the first brake B1, the second brake B2 and the third brake B3 in accordance with supply/discharge of hydraulic pressure, respectively. When an intended gear ratio is selected by the transmission means of a control device, which is not shown, a predetermined hydraulic servo corresponding to the intended gear ratio is selected from among the hydraulic servos C-1, C-2, C-3, C-0, B-1, B-2 and B-3 and predetermined hydraulic pressure for apply purposes is supplied to the selected hydraulic servo.

Reference symbol 50 denotes a strainer, 51 denotes an oil pump sucking/discharging oil from an oil tank, which is not shown, through the strainer 50, 52 denotes a primary regulator valve. The primary regulator valve 52 regulates hydraulic pressure in the oil passage L-1 and generates predetermined line pressure $P_L$. The line pressure $P_L$ is supplied to a solenoid modulator valve 53 through an oil passage L-2 and regulated by the solenoid modulator valve 53 to thereby generate a solenoid modulator pressure.

The line pressure $P_L$ generated by the primary regulator valve 52 is supplied to the fourth solenoid valve S4 through the oil passages L-1 and L-3 and to the fifth solenoid valve S5 through the oil passages L-1 and L-4, respectively. Further, the solenoid modulator pressure generated by the solenoid modulator valve 53 is supplied to the sixth solenoid valve DSL through an oil passage L-5, to the first solenoid valve SL1 through an oil passage L-6, to the second solenoid valve SL2 through an oil passage L-7 and to the third solenoid valve SL3 through an oil passage L-8.

Since the first to third solenoid valves SL1 to SL3 are of normally open type, signal hydraulic pressure is not generated when the respective solenoids are turned on (energized), and is generated when they are turned off (non-energized). Additionally, since the fourth and fifth solenoid valves S4 and S5 and the sixth solenoid valve DSL are of normally closed type, signal hydraulic pressure is generated when the respective solenoids are turned on (energized) and not generated when they are turned off (nonenergized).

Further, the line pressure $P_L$ is supplied to a manual valve 54 from the oil passage L-1 through oil passages L-9 and L-10. The manual valve 54 is switched by operating speed selection units, such as a shift lever, a switch and the like, which are not shown. When the forward range (FIG. 3) is selected, D range pressure $P_D$ is generated on an oil passage L-11. When the reverse range R is selected, R range pressure $P_R$ is generated in an oil passage L-12.

When the first solenoid valve SL1 receives a first solenoid signal from the control device, it regulates the solenoid modulator pressure supplied from the solenoid modulator valve 53, generates signal hydraulic pressure and supplies the signal hydraulic pressure to a B-1 control valve 55 through an oil passage L-15. When the second solenoid valve SL2 receives a second solenoid signal from the control device, it regulates solenoid modulator pressure supplied from the solenoid modulator valve 53, generates signal hydraulic pressure and supplies the signal hydraulic pressure to a solenoid relay valve 56 through an oil passage L-16. When the third solenoid valve SL3 receives the third solenoid signal from the control device, it regulates solenoid modulator pressure supplied from the solenoid modulator valve 53, generates signal hydraulic pressure and supplies the signal hydraulic pressure to a C-1 control valve 57 through an oil passage L-17.

The fourth solenoid valve S4 is turned on/off upon receiving the fourth solenoid signal from the control device. Then, the fourth solenoid valve S4 generates a signal hydraulic pressure and supplies the signal hydraulic pressure to a 4–5 shift valve 61 through an oil passage L-18. The fifth solenoid valve S5 is turned on/off upon receiving the fifth solenoid signal from the control device. Then, the fifth solenoid valve S5 generates a signal hydraulic pressure and supplies the signal hydraulic pressure to a solenoid relay valve 56 through an oil passage L-19. When the sixth solenoid valve DSL receives the sixth solenoid signal from the control device, it regulates solenoid modulator pressure supplied from the solenoid modulator valve 53, generates a signal hydraulic pressure and supplies the signal hydraulic pressure to the solenoid relay valve 56 through an oil passage L-22.

The solenoid relay valve 56 is switched by the signal hydraulic pressure supplied through the oil passage L-19. At the third or higher speed, the valve 56 is placed at the left half position, so that oil passage L-21 communicates with an oil passage L-31 and supplies the solenoid modulator pressure supplied through the oil passages L-5 and L-21, to a C-0 control valve 64. At the second or lower speed and during gear shift from second to third, the valve 56 is placed at the right half position so that oil passage L-16 communicates with oil passage L-31 and oil passage L-22 with oil passage L-32 to supply the signal hydraulic pressure supplied through the oil passage L-16 to the C-0 control valve 64 and to also supply the signal hydraulic pressure supplied through the oil passage L-22 to a B-2 control valve 65.

It is noted that the second and sixth solenoid valves SL2, DSL are used for lock-up control of the torque converter 12 at the third or higher speed. Therefore, at the third or higher speed, when the solenoid relay valve 56 is placed at the left half position, the signal hydraulic pressure supplied through the oil passage L-16 is supplied to a lock-up control valve, which is not shown, and the signal hydraulic pressure supplied through the oil passage L-22 is supplied to a lock-up relay valve, which is not shown.

The B-1 control valve 55 is supplied with a signal hydraulic pressure through the oil passage L-15, regulates the D range pressure $P_D$ supplied through the oil passages L-11, L-23 and L-24, generates B-1 control pressure $P_{B1}$ and supplies the B-1 control pressure $P_{B1}$ to a second B-1 apply control valve 62 serving as fail-safe means through an oil passage L-25.

The C-1 control valve 57 is supplied with a signal hydraulic pressure through the oil passage L-17, regulates D range pressure $P_D$ supplied through the oil passages L-11, L-23 and L-24, generates C-1 control pressure $P_{C1}$ and supplies the C-1 control pressure $P_{C1}$, to a clutch apply control valve 66 serving as fail-safe means through an oil passage L-35. The C-0 control valve 64 is supplied with a signal hydraulic pressure through the oil passage L-31, regulates D range pressure $P_D$ supplied through the oil passages L-11, L-23 and L-36, generates C-0 control pressure $P_{C0}$ and supplies C-0 control pressure $P_{C0}$ to the clutch apply control valve 66 through an oil passage L-37.

Further, the B-2 control valve 65 is supplied with a signal hydraulic pressure through the oil passage L-32, regulates the D range pressure $P_D$ supplied through the oil passages L-11, L-23 and L-40, generates B-2 control pressure $P_{B2}$ and supplies the B-2 control pressure $P_{B2}$ to a B-2 apply control valve 67 through an oil passage L-41. Each of the second B-1 apply control valve 62, the clutch apply control valve 66 and the B-2 apply control valve 67 consists of a switching valve.

The clutch apply control valve 66, serving as the fail-safe means of the invention, is selectively placed at a left half position as the first position and at a right half position as the second position. The clutch apply control valve 66 is supplied with the C-0 control pressure $P_{C0}$ through oil passages L-37 and L-51, placed at the left half position and supplies the C-0 control pressure $P_{C0}$ supplied through the oil passages L-37 and L-52 to the hydraulic servo C-0 through oil passage L-53. The clutch apply control valve 66 is supplied with C-1 control pressure $P_{C1}$ through the oil passages L-35 and L-54 or the oil passages L-35 and L-55 and is placed at the left half position. The valve 66 supplies the C-1 control $P_{C1}$ supplied through the oil passage L-35 and L-56 to the hydraulic servo C-1 through the oil passages L-57 and L-58.

The clutch apply control valve 66 is supplied with a D range pressure $P_0$ through the oil passages L-11, L-23 and L-61 or the oil passages L-11, L-23 and L-62. If the C-0 control pressure $P_{C0}$ and C-1 control pressure $P_{C1}$ are not supplied to the clutch apply control valve 66, then the valve 66 is placed at the right half position by the urging force of a spring, the oil passage L-61 is communicated with the oil passage L-57, the oil passage L-62 is communicated with the oil passage L-53 and the D range pressure $P_0$ is supplied to the hydraulic servos C-1 and C-0. If the clutch apply control valve 66 is placed at the left half position, the communication between the oil passages L-61 and L-57 and that between the oil passages L-62 and L-53 is shut off. The switching of the clutch apply control valve 66 from the left half position to the right half position will be described later.

Next, the second B-1 apply control valve 62 serving as the fail-safe means of the invention is selectively placed at a left half position as a first position and at a right half position as a second position. The second B-1 apply control valve 62 is supplied with B-1 control pressure $P_{B1}$ through the oil passages L-25 and L-63 or the oil passages L-25 and L-64 or supplied with hydraulic pressure (C-1 control pressure $P_{C1}$ or D range pressure $P_D$) supplied to the hydraulic servo C-1 through the oil passages L-57, L-65 and L-66, placed at the left half position and supplies the B-1 control pressure $P_{B1}$ supplied through the oil passages L-25 and L-67 to a first B-1 apply control valve 71 through oil passages L-71 and L-72 or oil passages L-71 and L-73. The second B-1 apply control valve 62 is supplied with D range pressure $P_D$ through the oil passages L-11, L-23 and L-68.

If the B-1 control pressure $P_{B1}$ and the hydraulic pressure supplied to the hydraulic servo C-1 are not supplied to the second B-1 apply control valve 62, the valve 62 is placed at the right half position by the urging force of a spring. Then, the oil passage L-68 is communicated with the oil passage L-71 and the D range pressure $P_D$ is supplied to the first B-1 apply control valve 71 through the oil passages L-72 and L-73. Further, if the second B-1 apply control valve 62 is placed at the left half position, the communication between the oil passages L-68 and L-71 is shut off. The switching of the second B-1 apply control valve 62 from the left half position to the right half position will be described later.

Next, the first B-1 apply control valve 71 is selectively placed at a left half position as the first position and at a right half position as the second position. The first B-1 apply control valve 71 is supplied with line pressure $P_L$ through the oil passages L-1, L-9, L-81 and L-82, placed at the left half position and supplies the pressure (B-1 control pressure $P_{B1}$ or D range pressure $P_D$) supplied through the oil passages L-71 and L-72 to the hydraulic servo B-1 through an oil passage L-83. The B-1 control pressure $P_{B1}$ or D range pressure $P_D$ through the oil passages L-71 and L-73, the hydraulic pressure supplied to the hydraulic servo C-1 through the oil passages L-57, L-65 and L-87 and the hydraulic pressure supplied to the hydraulic servo C-0 through the oil passages L-53, L-85 and L-86 act on the first B-1 apply control valve 71 such that the spool a is moved upward, i.e., placed at a right half position. If the first B-1 apply control valve 71 is supplied with these three hydraulic pressures, the sum of the hydraulic pressures amounts to predetermined pressure or higher and is placed at the right half position, then the communication between the oil passages L-72 and L-83 is shut off and the oil passage L-83 is communicated with a drain port. The switching of the first B-1 apply control valve 71 from the left half position to the right half position will be described later.

Next, the B-2 apply control valve 67 is supplied with line pressure $P_L$ through the oil passages L-1, L-9, L-81, L-82 and L-93, placed at the left half position, and supplies the B-2 control pressure $P_{B2}$ supplied through the oil passages L-41 and L-44 to the hydraulic servo B-2 through an oil passage L-95. The B-2 control pressure $P_{B2}$ through the oil passages L-41 and L-45, the hydraulic pressure supplied to the hydraulic servo C-0 of the fourth clutch C0 through the oil passages L-85 and L-96 and the hydraulic pressure supplied to the hydraulic servo B-1 through an oil passage L-97 act on the B-2 apply control valve 67 such that a spool a is moved upward, i.e., placed at the right half position. If the B-2 apply control valve 67 is supplied with two out of the three hydraulic pressures, the sum of the two hydraulic pressures amounts to predetermined pressure or higher and the B-2 apply control valve 67 is placed at the right half position, then communication between the oil passages L-44 and L-95 is shut off and the oil passage L-95 communicates with the drain port. The switching of the B-2 apply control valve 67 from the left half position to the right half position will be described later. If the R range is selected by driver's operation, R range pressure $P_R$ supplied through the oil passages L-12 and L-94 functions to place the B-2 apply control valve 67 at the left half position, thereby ensuring that the B-2 apply control valve 67 is fixed to the left half position.

The 4–5 shift valve 61 is supplied with signal hydraulic pressure through the oil passage L-18 and placed at the left half position at the first to fourth speeds. The 4–5 shift valve 61 then supplies the line pressure $P_L$, supplied through the oil passages L-1, L-9 and L-81, to the hydraulic servo B-3 through an oil passage L-98. The 4–5 shift valve 61 is placed at a right half position at the fifth speed and supplies the D range pressure $P_D$, supplied through the oil passage L-11, to the hydraulic servo C-3 through an oil passage L-99.

Next, with reference to the hydraulic circuit shown in FIGS. 1 and 4 as well as the operation table shown in FIG. 3, the operation of the hydraulic circuit at the respective gear ratios will be described.

First, at the first speed in ranges other than the L range, the line pressure $P_L$ regulated by the primary regulator valve 52 is supplied to the 4–5 shift valve 61 through the oil passages L-1, L-9 and L-81. The 4–5 shift valve 61 is placed at a left half position by the signal hydraulic pressure supplied from the fourth solenoid valve S4. As a result, the oil passage L-81 is communicated with the oil passage L-98 and the line pressure $P_L$ is supplied to the hydraulic servo B-3, thereby engaging the third brake B3. Also, the first solenoid valve SL1 is energized and the communication between the oil passages L-6 and L-15 is shut off, so that no signal hydraulic pressure is generated in the oil passage L-15 and no hydraulic pressure is supplied to the B-1 control valve 55.

The communication between the oil passages L-24 and L-25 is, therefore, shut off and no B-1 control pressure $P_{B1}$ is generated in the oil passage L-25.

Likewise, the second solenoid valve SL2 is energized and the communication between the oil passages L-7 and L-16 is shut off. The fifth solenoid valve S5 is deenergized and the solenoid relay valve 56 is placed at the right half position. Thus, even if the oil passage L-16 is communicated with the oil passage L-31, a signal hydraulic pressure is not generated in the oil passage L-16 and no hydraulic pressure is supplied to the C-0 control valve 64.

The communication between the oil passages L-36 and L-37 is, therefore, shut off and the C-0 control pressure $P_{C0}$ is not generated in the oil passage L-37.

Next, the third solenoid valve SL3 generates a predetermined signal hydraulic pressure according to a signal from the control device, which is not shown, in the oil passage L-17, with the solenoid modulator pressure of the oil passage L-8 as the original pressure. The signal hydraulic pressure generated in the oil passage L-17 is fed to the C-1 control valve 57, the D range pressure $P_D$ supplied through the oil passages L-11, L-23 and L-34 is set as the C-1 control pressure $P_{C1}$, which is supplied to the clutch apply control valve 66 through the oil passages L-35 and L-54, the oil passages L-35 and L-55 or the oil passages L-35 and L-56. The C-1 control pressure $P_{C1}$ supplied to the clutch apply control valve 66 through the oil passages L-35 and L-54 or the oil passages L-35 and L-55 functions to place the clutch apply control valve 66 at the left half position.

The C-1 control pressure $P_{C1}$ supplied to the clutch apply control valve 66 through the oil passages L-35 and L-56 is, therefore, supplied to the hydraulic servo C-1 through the oil passages L-57 and L-58, thereby engaging the first clutch C1. Furthermore, since the oil passage L-57 is communicated with the second B-1 apply control valve 62 through the oil passages L-65 and L-66, the C-1 control pressure $P_{C1}$ maintains the second B-1 apply control valve 62 at the left half position. The oil passage L-57 is communicated with the first B-1 apply control valve 71 through the oil passages L-65 and L-87. The hydraulic pressure supplied to the first B-1 apply control valve 71 acts on the spool a so as to switch the position of the B-1 apply control valve 71 to the right half position. However, a force for switching the position of the first B-1 apply control valve 71 to the right half position (the product of the hydraulic pressure supplied through the oil passage L-87 and the area of the surface of the spool a applied with the hydraulic pressure) is surpassed by that for maintaining the first B-1 apply control valve 71 at the left half position (the product of the line pressure $P_L$ supplied through the oil passage L-82 and the area of the surface of a spool b applied with the line pressure $P_L$). Thus, the first B-1 apply control valve 71 is maintained at the left half position.

Next, the sixth solenoid valve DSL is de-energized and the communication between the oil passages L-5 and L-22 is shut off. Because no hydraulic pressure is generated in the oil passage L-22, the fifth solenoid valve S5 is de-energized and the solenoid relay valve 56 is placed at the right half position. Thus, even if the oil passage L-22 is communicated with the oil passage L-32, no hydraulic pressure is supplied to the B-2 control valve 65 and the valve 65 is placed at the left half position.

Accordingly, the communication between the oil passages L-40 and L-41 is shut off and no B-2 control pressure $P_{B2}$ is generated in the oil passage L-41.

As can be seen from the above, the first clutch C1 and the third brake B3 are engaged and the first one-way clutch F1 is locked, thereby realizing the first speed.

Further, in the L range, it is necessary to engage the second brake B2 so as to effect engine brake. Then, the sixth solenoid signal is fed from the control device to the sixth solenoid valve DSL to thereby engage the second brake 132. Using the solenoid modulator pressure supplied through the oil passage L-5 as original pressure, the sixth solenoid valve DSL generates a signal pressure corresponding to the sixth solenoid signal fed from the control device, which is not shown, in the oil passage L-22.

The fifth solenoid valve S5 is de-energized and the solenoid relay valve 56 is placed at the right half position. As a result, the oil passage L-22 is communicated with the oil passage L-32 and the signal hydraulic pressure supplied from the sixth solenoid valve DSL is supplied to the B-2 control valve 65 through the oil passage L-32. The B-2 control valve 65 controls the degree of communication between the oil passages L-40 and L-41 in accordance with the signal hydraulic pressure from the sixth solenoid valve DSL and generates B-2 control pressure $P_{B2}$ in the oil passage L-41. The B-2 control pressure $P_{B2}$ is supplied to the B-2 apply control valve 67 through the oil passages L-41 and L-44. Then, the line pressure $P_L$ supplied to the B-2 apply control valve 67 through the oil passages L-1, L-9, L-81 and L-93 functions to place the B-2 apply control valve 67 at the left half position. The B-2 control pressure $P_{B2}$ is, therefore, supplied to the hydraulic servo B-2 of the second brake B2 through the oil passage L-95, thereby engaging the second brake B2. As a result, engine brake at the first speed is realized.

Next, the second speed will be described.

The second speed is attained by engaging the first brake B1 in addition to the first-speed state in ranges other than the L range. The control device outputs the first solenoid signal to the first solenoid valve SL1 energized at the first speed and hydraulic pressure corresponding to the first solenoid signal is generated in the oil passage L-15 with the hydraulic pressure from the oil passage L-6 as the original pressure. At the first speed, the communication between the oil passages L-24 and L-25 is shut off and the oil passage L-25 communicates with the drain port. At the second speed, the degree of the communication between the oil passages L-24 and L-25 is controlled in accordance with the first solenoid signal from the control device based on the signal hydraulic pressure supplied through the oil passage L-15. As a result, B1 control pressure $P_{B1}$ is generated at the B-1 control valve 55.

The B1 control pressure $P_{B1}$ is supplied to the second B-1 apply control valve 62 through the oil passages L-25 and L-63 or the oil passages L-25 and L-64 to thereby place the second B-1 apply control valve 62 at the left half position. However, because the oil passages L-65 and L-66 are connected to the second B-1 apply control valve 62 and the C-1 control pressure $P_{C1}$ functions to place the second B-1 apply control valve 62 at the left half position, the second B-1 apply control valve 62 is maintained at the left half position.

The B-1 control pressure $P_{B1}$ generated in the oil passage L-25 is supplied to the second B-1 apply control valve 62 through the oil passage L-67 and further supplied to the first B-1 apply control valve 71 through the oil passages L-71 and L-72 and the oil passages L-71 and L-73. In the oil passage L-73, a force for switching the position of the first B-1 apply control valve 71 to the right half position (the product of the hydraulic pressure supplied through the oil passage L-73 and the area of the surface of the spool a applied with the hydraulic pressure+the product of the hydraulic pressure supplied through the oil passage L-87 and the area of the surface of the spool a applied with the hydraulic pressure) is surpassed by that for maintaining the first B-1 apply control valve 71 at the left half position (the product of the line pressure $P_L$ supplied through the oil passage L-82 and the area of the surface of the spool b applied with the line pressure $P_L$). Thus, the first B-1 apply control valve 71 is maintained at the left half position. As a result, the communication between the oil passages L-72 and L-83 is maintained and the B-1 control pressure $P_{B1}$ is supplied to the hydraulic servo B-1.

Furthermore, the B-1 control pressure $P_{B1}$ is supplied to the B-2 apply control valve 67 through an oil passage L-97 branched from the oil passage L-83 to thereby switch the position of the B-2 apply control valve 67 to the right half position. However, a force for switching the position of the B-2 apply control valve 67 to the right half position (the product of the hydraulic pressure supplied through the oil passage L-97 and the area of the surface of the spool a applied with the hydraulic pressure) is surpassed by that for placing the B-2 apply control valve 67 at the left half position (the product of the line pressure $P_L$ supplied through the oil passage L-93 and the area of the surface of the spool b applied with the line pressure $P_L$). Due to this, the B-2 apply control valve 67 is placed at the left half position.

Next, the third speed will be described.

The third speed is realized by engaging the fourth clutch C0 and disengaging the first brake B1 in addition to the second-speed state. Namely, if the first clutch C1, the fourth clutch C0 and the third brake B3 are engaged, the third speed is attained. If the hydraulic pressure within the hydraulic servo B-1 of the first brake B1 engaged at the second speed acts on the first solenoid valve SL1 in accordance with the first solenoid signal from the control device, it communicates with the drain port through the oil passage L-83, the first B-1 apply control valve 71, the oil passages L-72 and L-71, the second B-1 apply control valve 62, the oil passages L-67 and L-25 and the B-1 control valve 55 and drains. At the same time, the hydraulic pressure acting on the B-2 apply control valve 67 through the oil passage L-97 and the hydraulic pressure acting on the first B-1 apply control valve 71 through the oil passage L-73 are drained as well.

The second solenoid valve SL2 is controlled to generate predetermined signal pressure in the oil passage L-16 based on the second solenoid signal from the control device with the solenoid modulator pressure of the oil passage L-7 as original pressure. The oil passage L-16 is connected to the solenoid relay valve 56. Although the solenoid relay valve 56 is placed at the left half position at the third or higher speed, the valve 56 is maintained at the right half position until the third speed is attained, i.e., during the gear shift from second to third.

During the gear shift from second to third, therefore, the oil passage L-16 is connected to the oil passage L-31 through the solenoid relay valve 56. When the signal hydraulic pressure is supplied to the C-0 control valve 64 through the oil passage L-16, the solenoid relay valve 56 and the oil passage L-31, the D range pressure $P_D$ supplied through the oil passages L-11, L-23 and L-36 is regulated into the C-0 control pressure $P_{C0}$, which is supplied to the clutch apply control valve 66 through the oil passages L-37 and L-51 and the oil passages L-37 and L-52. Further, the C-0 control pressure $P_{C0}$ supplied through the oil passages L-37 and L-51 to the clutch apply control valve 66 functions to place the clutch apply control valve 66 at the left half position. The C-0 control pressure $P_{C0}$ supplied through the oil passages L-37 and L-52 to the clutch apply control valve 66 is, therefore, supplied to the hydraulic servo C-0 of the fourth clutch C0 through the oil passage L-53, thereby engaging the fourth clutch C0.

The pressure at which the hydraulic servo C-0 is engaged is supplied to the first B-1 apply control valve 71 through the oil passages L-85 and L-86 and functions to switch the position of the first B-1 apply control valve 71 to the right half position. However, since the force for switching the position of the first B-1 apply control valve 71 to the right half position (the product of the fourth clutch C0 engagement pressure supplied through the oil passage L-86 and the area of the surface of the spool a applied with the engagement pressure+the product of the first clutch C1 engagement pressure supplied through the oil passage L-87 and the area of the surface of the spool a applied with the engagement pressure) is surpassed by that for placing the valve 71 at the left half position (the product of the line pressure $P_L$ supplied through the oil passage L-82 and the area of the surface of the spool b applied with the line pressure $P_L$), the first B-1 apply control valve 71 is maintained at the left half position.

Furthermore, the hydraulic servo C-0 engagement pressure is supplied to the B-2 apply control valve 67 through the oil passages L-85 and L-96 and functions to switch the position of the B-2 apply control valve 67 to the right half position. However, because the force switching the position of the B-2 apply control valve 67 to the right half position (the product of the fourth clutch C0 engagement pressure supplied through the oil passage L-96 and the area of the surface of the spool a applied with the engagement pressure) is surpassed by a force placing the B-2 apply control valve 67 at the left half position (the product of the line pressure $P_L$ supplied through the oil passage L-93 and the area of the surface of the spool b applied with the line pressure $P_L$), the B-2 apply control valve 67 is maintained at the left half position.

Thereafter, when the gear shift to the third speed is completed, the fifth solenoid valve S5 is energized by the fifth solenoid signal from the control device and a signal hydraulic pressure is generated in the oil passage L-19 with the line pressure $P_L$ from the oil passages L-1 and L-4 as the original pressure. By doing so, the position of the solenoid relay valve 56 is switched to the left half position and the second solenoid valve SL2 and the sixth solenoid valve DSL are used to control a lock-up control valve which is not shown.

By switching the position of the solenoid relay valve 56 to the left half position, the solenoid modulator pressure outputted from the solenoid modulator valve 53 is supplied to the C-0 control valve 64 through the oil passages L-5 and L-21, the solenoid relay valve 56 and the oil passage L-31 and functions to maintain the communication between the oil passages L-36 and L-37. By doing so, at the third or higher gear ratios, the fourth clutch C0 is kept engaged. Besides, the oil passage L-32 supplying the signal hydraulic pressure for controlling the B-2 control valve 65 is connected to the drain port by switching the position of the solenoid relay valve 56 to the left half position, whereby the B-2 control valve 65 is maintained at the left half position and the communication between the oil passages L-40 and L41 is shut off.

Next, the fourth speed will be described.

The fourth speed is attained by engaging the first brake B1 and disengaging the first clutch C1 in addition to the third-speed state. Namely, if the fourth clutch C0, the first brake B1 and the third brake B3 are engaged, the fourth speed is attained. If the third solenoid valve SL3 is actuated by the third solenoid signal from the control device, the hydraulic pressure within the hydraulic servo C-1 of the first clutch C1, which has been engaged at the third speed, communicates with the drain port through the oil passages L-58 and L-57, the clutch apply control valve 66, the oil passages L-56 and L-35 and the C-1 clutch control valve 57 and drains.

The first solenoid valve SL1 generates hydraulic pressure in the oil passage L-15 by means of the first solenoid signal from the control device with the solenoid modulator pressure in the oil passage L-6 as the original pressure. The signal hydraulic pressure acts on the B-1 control valve 55 through the oil passage L-15 to thereby generate B-1 control pressure $P_{B1}$ in the oil passage L-25 with the D-range pressure $P_D$ in the oil passage L-24 as the original pressure. The B-1 control pressure $P_{B1}$ acts on the second B-1 apply control valve 62 through the oil passages L-25 and L-63 and the oil passages L-25 and L-64 such that the valve 62 is placed at the left half position. Here, because the hydraulic pressure of the hydraulic servo C-1 is drained by the gear shift from third to fourth, the force for placing the second B-1 apply control valve 62 at the left half position is lost. However, as the B-1 control pressure $P_{B1}$ is supplied to the second B-1 apply control valve 62 through the oil passages L-25 and L-63 and the oil passages L-25 and L-64, the valve 62 is maintained at the left half position.

The B-1 control pressure $P_{B1}$ supplied to the second B-1 apply control valve 62 through the oil passages L-25 and L-67 is supplied to the first B-1 apply control valve 71 through the oil passages L-71 and L-73. The hydraulic pressure supplied to the first B-1 apply control valve 71 functions to switch the position of the first B-1 apply control valve 71 to the right half position. However, since a force for switching the position of the first B-1 apply control valve 71 to the right half position (the product of the hydraulic pressure supplied through the oil passage L-73 and the area of the surface of the spool a applied with the hydraulic pressure+the product of the hydraulic pressure through the oil passage L-86 and the area of the surface of the spool a applied with the hydraulic pressure) is surpassed by that for placing the valve 71 at the left half position (the product of the line pressure $P_L$ supplied through the oil passage L-82 and the area of the surface of the spool b applied with the line pressure $P_L$), the first B-1 apply control valve 71 is maintained at the left half position. As a result, the communication between the oil passages L-72 and L-83 is maintained and the B-1 control pressure $P_{B1}$ is supplied to the hydraulic servo B-1.

Moreover, the hydraulic servo B-1 engagement pressure is supplied to the B-2 apply control valve 67 through the oil passage L-97 and functions to switch the position of the B-2 apply control valve 67 to the right half position. Then, the force for switching the position of the B-2 apply control valve 67 to the right half position (the product of the fourth clutch C0 engagement pressure supplied through the oil passage L-96 and the area of the surface of the spool a applied with the engagement pressure+the product of the first brake B1 engagement pressure supplied through the oil passage L-97 and the area of the surface of the spool a applied with the engagement pressure) surpasses that for placing the valve 67 at the left half position (the product of the line pressure $P_L$ supplied through the oil passage L-93 and the area of the surface of the spool b applied with the line pressure $P_L$). Thus, the position of the B-2 apply control valve 67 is switched to the right half position.

Next, the fifth speed will be described.

The fifth speed is attained by engaging the third clutch C3 and disengaging the third brake B3 in addition to the fourth-speed state. Namely, if the third clutch C3, the fourth clutch C0 and the first brake B1 are engaged, the fifth speed is attained. Signal hydraulic pressure is generated from the fourth solenoid valve S4 by the fourth solenoid signal from the control device, the left half position of the 4–5 shift valve 61 is switched to the right half position. As a result, the communication between the oil passages L-81 and L-98 is shut off, the oil passage L-98 is communicated with the drain port through the 4–5 shift valve 61 and the hydraulic pressure of the hydraulic servo B-3 is drained. Also, although the oil passage L-99 has been communicated with the drain port through the 4–5 shift valve 61, it is communicated with the oil passage L-11 by switching the position of the 4–5 shift valve to the right half position. As a result, the D range pressure $P_D$ is supplied to the hydraulic servo C-3 of the third clutch C3 through the oil passage L-11, the 4–5 shift valve 61 and the oil passage L-99.

Next, the reverse gear ratio will be described.

The reverse gear ratio is attained if the driver operates a shift lever to switch the manual valve 54. Namely, by switching the manual valve 54, R range pressure $P_R$ is generated in the oil passage L-12.

Now, a description will be given of the states of the respective solenoid valves. Because the first to third solenoid valves SL1 to SL3 are energized and each turned into a state in which no signal hydraulic pressure is generated, the B-1 control pressure $P_{B1}$, the C-0 control pressure $P_{C0}$ and the C-1 control pressure $P_{C1}$ are not outputted from the B-1 control valve 55, C-0 control valve 64 and C-1 control valve 57, respectively. Further, since the B-1 control valve 55, the C-0 control valve 64 and the C-1 control valve 57 employ the D range pressure $P_D$ as original pressure, even if a failure occurs to a solenoid valve, hydraulic pressure is not erroneously outputted.

Additionally, as the fourth solenoid valve S4 is de-energized and no signal hydraulic pressure is generated in the oil passage L-18, the 4–5 shift valve 61 is placed at the left half position. The line pressure $P_L$ supplied to the 4–5 shift valve 61 through the oil passage L-81 is supplied to the hydraulic servo B-3 through the oil passage L-98.

The solenoid relay valve 56, which is not supplied with hydraulic pressure from the fifth solenoid valve S5, is placed at the right half position, so that the oil passage L-22 is communicated with the oil passage L-32. However, because the sixth solenoid valve DSL is de-energized and no hydraulic pressure is generated in the oil passage L-22, the B-2 control valve 65 is placed at the left half position. As a result, the R range pressure $P_R$ outputted from the manual valve 54 is supplied to the hydraulic servo C-2 through the oil passages L-12, L-38 and L-42, the B-2 control valve 65 and the oil passage L-43.

The R range pressure $P_R$ is supplied to the B-2 apply control valve 67 through the oil passages L-12, L-38 and L-39, the B-2 control valve 65 and the oil passages L-41 and L-45 and functions to switch the position of the B-2 apply control valve 67 to the right half position. However, because the force for switching the position of the B-2 apply control valve 67 to the right half position (the product of the R range pressure $P_R$ supplied through the oil passage L-45 and the area of the surface of the spool a applied with the R range pressure $P_R$) is surpassed by that for placing the valve 67 at the left half position (the product of the line pressure $P_L$ supplied through the oil passage L-93 and the area of the surface of the spool b applied with the line pressure $P_L$+the product of the R range pressure $P_R$ supplied through the oil passage L-94 and the area of the surface of the spool a applied with the R range pressure $P_R$), the B-2 apply control valve 67 is maintained at the left half position. As a result, the R range pressure $P_R$ supplied through the oil passages L41 and L-44 is supplied to the hydraulic servo B-2 through the oil passage L-95.

In this embodiment, if the first brake B1 and the second brake B2, the fourth clutch C0 and the second brake B2 or the first clutch C1, the fourth clutch C0 and the first brake B1 are simultaneously engaged, respectively, interlock occurs. In this embodiment, even if failure occurs to a solenoid valve or the like, the occurrence of simultaneous engagement is prevented. Next, a description will be given of the operation of the hydraulic circuit if a failure occurs to the valves and the solenoid valves provided to control the engagement pressure of the first clutch C1, the fourth clutch C0 as well as the first brake B1 and the second brake B2 at each gear ratio.

At the first speed in ranges other than the L range, the first clutch C1 and the third brake B3 are engaged in a normal state.

First, a description will be given to a case where the failure occurs to either the sixth solenoid valve DSL or the B-2 control valve 65.

In this case, hydraulic pressure is supplied to the oil passage L-41 and then supplied to the hydraulic servo B-2 through the oil passages L-44, the B-2 apply control valve 67 and the oil passage L-95, thereby engaging the second brake B2. Thus, the first speed at which engine brake is effected is attained.

Next, a description will be given of a case where failure occurs to either the first solenoid valve SL1 or the B-1 control valve 55.

In this case, hydraulic pressure is supplied to the oil passage L-25 and then supplied to the second B-1 apply control valve 62 through the oil passage L-67. At the first speed, the C-1 control pressure $P_{C1}$ is supplied to the hydraulic servo C-1. Because of this, the C-1 control pressure $P_{C1}$ is supplied to the second B-1 apply control valve 62 through the oil passage L-66 and the valve 62 is placed at the left half position. The oil passage L-67 communicates with the oil passage L-71, accordingly. The first B-1 apply control valve 71 is applied with hydraulic pressure for switching the position of the first B-1 apply control valve 71 to the right half position through the oil passages L-73 and L-87. Since the force maintaining the first B-1 apply control valve 71 at the left half position surpasses that for switching the position of the valve 71 to the right half position, the first B-1 apply control valve 71 is not switched. Therefore, the oil passage L-72 communicates with the oil passage L-83 and the hydraulic pressure is supplied to the hydraulic servo B-1, thereby engaging the first brake B1.

As a result, the second speed can be attained.

Next, a description will be given of the case where failure occurs to either the second solenoid valve SL2 or the C-0 control valve 64.

In this case, hydraulic pressure is supplied to the oil passage L-37 and then supplied to the clutch apply control valve 66 through the oil passage L-52. At the first speed, hydraulic pressure is outputted from the C-1 control valve 57. Because of this, the clutch apply control valve 66 is placed at the left half position by the hydraulic pressure from the oil passage L-54 or L-55. The hydraulic pressure of the oil passage L-52 is, therefore, supplied to the hydraulic servo C-0 through the oil passage L-53. Thereafter, the fourth clutch C0 engagement pressure and the first clutch C1 engagement pressure function to switch the position of the first B-1 apply control valve 71 to the right half position. However, because a force for maintaining the valve 71 at the left half position surpasses that for switching the position of the valve 71 to the right half position, the first B-1 apply control valve 71 is not switched. Although the fourth clutch C0 engagement pressure also acts on the B-2 apply control valve 67, the valve 67 is maintained at the left half position as well.

Hence, the third speed can be attained.

Next, a description will be given of a case where failure occurs to either the third solenoid valve SL3 or the C-1 control valve 57.

In this case, the communication between the oil passages L-34 and L-35 is shut off and the oil passage L-35 communicates with the drain port. Accordingly, the oil passages L-54 and L-55 are not supplied with hydraulic pressure and the position of the clutch apply control valve 66, which has been placed at the left half position, is switched to the right half position by the urging force of a spring. When the position of the clutch apply control valve 66 is switched to the right half position, the oil passages L-61 and L-62 supplied with the D range pressure $P_D$ are communicated with the oil passages L-57 and L-53, respectively, and the D range pressure Pd is supplied to the hydraulic servos C-0 and C-1. Also, by supplying the hydraulic pressure to the hydraulic servos C-0 and C-1, the fourth clutch C0 engagement pressure and the first clutch C1 engagement pressure function to switch the position of the first B-1 apply control valve 71 to the right half position. However, the force for switching the position of the valve 71 to the right half position is surpassed by that for maintaining the valve 71 at the left half position, so that the first B-1 apply control valve 71 is not switched. In addition, although the fourth clutch C0 engagement pressure also acts on the B-2 apply control valve 67, the valve 67 is maintained at the left half position as well.

Hence, the third speed can be attained.

Next, the first speed in the L range will be described.

At the first speed in the L range, the first clutch C1, the second brake B2 and the third brake B3 are engaged in a normal state.

First, a description will be given to the case where failure occurs to either the sixth solenoid valve DSL or the B-2 control valve 65.

In this case, the communication between the oil passages L-41 and L-40 is shut off and the oil passage L-41 communicates with the oil passage L-39. The hydraulic servo B-2 is, therefore, in communication with the drain port through the oil passage L-95, the B-2 apply control valve 67, the oil passages L-44 and L-41, the B-2 control valve 65, the oil passages L-39, L-38 and L-12 and the manual valve 54. By doing so, the hydraulic pressure of the hydraulic servo B-2 is drained and the second brake B2 is thereby disengaged.

The first speed at which engine brake is not effected can be, therefore, attained.

Next, description will be given to a case where failure occurs to either the first solenoid valve SL1 or the B-1 control valve 55.

In this case, hydraulic pressure is supplied to the oil passage L-25 and then supplied to the second B-1 apply control valve 62 through the oil passage L-67. At the first speed, the hydraulic servo C-1 is supplied with hydraulic pressure. Thus, the second B-1 apply control valve 62 is placed at the left half position by the hydraulic pressure from the oil passage L-66.

As a result, the oil passage L-67 communicates with the oil passage L-71. Although the hydraulic pressure acts on the first B-1 apply control valve 71 through the oil passages L-73 and L-87 so as to switch the position of the valve 71 to the right half position, the switching force is surpassed by that for maintaining the valve 71 at the left half position. Because of this, the first B-1 apply control valve 71 is not switched. As a result, the oil passage L-72 communicates with the oil passage L-83 and the hydraulic pressure is supplied to the hydraulic servo B-1, thereby engaging the first brake B1.

Further, the hydraulic pressure supplied to the hydraulic servo B-1 is supplied to the B-2 apply control valve 67 through the oil passage L-97 and functions to switch the position of the B-2 apply control valve 67 to the right half position. Since the force for switching the position of the B-2 apply control valve 67 to the right half position (the product of the B-2 control pressure $P_{B2}$ supplied through the oil passage L-45 and the area on the surface of the spool a applied with the B-2 control pressure $P_{B2}$+the product of the hydraulic pressure supplied to the hydraulic servo B-1 through the oil passage L-97 and the area of the surface of spool a applied with the hydraulic pressure) surpasses that for placing the B-2 apply control valve 67 at the left half position (the product of the line pressure $P_L$ supplied through the oil passage L-93 and the area of the surface of the spool a applied with the line pressure $P_L$), the position of the B-2 apply control valve 67 is switched to the light half position. As a result, the communication between the oil passage L-44 and L-95 is shut off and the hydraulic servo B-2 communicates with the drain port through the oil passage L-95 and the B-2 apply control valve 67, thereby disengaging the second brake B2.

Hence, the second speed can be attained.

Next, a description will be given for a case where failure occurs to either the second solenoid valve SL2 or the C-0 control valve 64.

In this case, hydraulic pressure is supplied to the oil passage L-37 and then supplied to the clutch apply control valve 66 through the oil passage L-52. At the first speed, hydraulic pressure is outputted from the C-1 control apply valve. Because of this, the clutch apply control valve 66 is placed at the left half position by the hydraulic pressure from either the oil passage L-54 or L-55.

Accordingly, the hydraulic pressure of the oil passage L-52 is supplied to the hydraulic servo C-0 through the oil passage L-53. Then, the fourth clutch C0 engagement pressure and the first clutch C1 engagement pressure function to switch the position of the first B-1 apply control valve 71 to the right half position. The switching force is surpassed by that for maintaining the valve 71 at the left half position. Thus, the first B-1 apply control valve 71 is not switched.

Further, hydraulic pressure is supplied from the hydraulic servo C-0 to the B-2 apply control valve 67 through the oil passages L-85 and L-96. As a result, the force for switching the position of the B-2 apply control valve 67 to the right half position (the product of the B-2 control pressure $P_{B2}$ supplied through the oil passage L-45 and the area of the surface of the spool a applied with the B-2 control pressure $P_{B2}$ +the product of the hydraulic pressure supplied to the hydraulic servo C-0 through the oil passage L-96 and the area of the surface of the spool a applied with the hydraulic pressure) surpasses that for placing the valve 67 at the left half position (the product of the line pressure $P_L$ supplied through the oil passage L-93 and the area of the surface of the spool b applied with the line pressure $P_L$). The position of the B-2 apply control valve 67 is, therefore, switched to the right half position. As a result, the communication between the oil passages L-44 and L-95 is shut off and the hydraulic servo B-2 communicates with the drain port through the oil passage L-95 and the B-2 apply control valve 67, thereby disengaging the second brake B2.

Hence, the third speed can be attained.

Next, a description will be given for a case where failure occurs to either the third solenoid valve SL3 or the C-1 control valve 57.

In this case, the communication between the oil passages L-34 and L-35 is shut off and the oil passage L-35 communicates with the drain port. Supply of the hydraulic pressure, which has allowed the clutch apply control valve 66 to be placed at the left half position, to the oil passages L-54 and L-55, is stopped and the position of the clutch apply control valve 66 is switched to the right half position. When the position of the clutch apply control valve 66 is switched to the right half position, the oil passages L-61 and L-62 and the oil passages L-57 and L-53 communicate with each other, respectively, and the D range pressure $P_D$ is supplied to the hydraulic servos C-0 and C-1. Further, when the hydraulic pressure is supplied to the hydraulic servos C-0 and C-1, the fourth clutch C0 engagement pressure and the first clutch C1 engagement pressure function to switch the position of the first B-1 apply control valve 71 to the right half position. However, this switching force is surpassed by that for maintaining the valve 71 at the left half position. The first B-1 apply control valve 71 is not, therefore, switched.

Then, the pressure supplied to the hydraulic servo C-0 acts on the B-2 apply control valve 67 through the oil passages L-85 and L-96. As a result, a force for switching the position of the B-2 apply control valve 67 to the right half position (the product of the B-2 control pressure $P_{B2}$ supplied through the oil passage L-45 and the area of the surface of the spool a applied with the B-2 control pressure $P_{B2}$+the product of the hydraulic pressure supplied to the hydraulic servo C-0 through the oil passage L-96 and the area of the surface of the spool a applied with the hydraulic pressure) surpasses that for placing the B-2 apply control valve 67 at the left half position (the product of the line pressure $P_L$ supplied through the oil passage L-93 and the area of the surface of the spool b applied with the line pressure $P_L$). The position of B-2 apply control valve 67 is, therefore, switched to the right half position. As a result, the communication between the oil passages L-44 and L-95 is shut off and the hydraulic pressure serve B-2 is communicated with the drain port through the oil passage L-95 and the B-2 apply control valve 67, thereby disengaging the second brake B2.

Hence, the third speed can be attained.

Next, the second speed will be described.

At the second speed, the first clutch C1, the first brake B1 and the third brake B3 are engaged in a normal state.

First, a description will be given for a case where a failure occurs to either the sixth solenoid valve DSL or the B-2 control valve 65.

In this case, hydraulic pressure is supplied to the oil passage L-41 and then supplied to the B-2 apply control valve 67 through the oil passage L-45 and functions to place the B-2 apply control valve 67 at the right half position. As a result, a force for switching the position of the B-2 apply control valve 67 to the right half position (the product of the hydraulic pressure supplied through the oil passage L-45 and the area of the surface of the spool a applied with the hydraulic pressure+the product of the first brake B1 engagement pressure supplied through the oil passage L-45 and the area of the surface of the spool a applied with the engagement pressure) surpasses that for placing the valve 67 at the left half position (the product of the line pressure $P_L$ supplied through the oil passage L-93 and the area of the surface of the spool b applied with the line pressure $P_L$). The B-2 apply control valve 67 is, therefore, placed at the right half position. Accordingly, even if failure causes the supply of hydraulic pressure to the oil passage L-41, the communication between the oil passages L-44 and L-95 is shut off and the hydraulic servo B-2 communicates with the drain port through the oil passage L-95 by switching the B-2 apply control valve 67.

Consequently, the second speed can be attained.

Next, a description will be given for a case where a failure occurs to either the first solenoid valve SL1 or the B-1 control valve 55.

In this case, the communication between the oil passages L-25 and L-24 is shut off and the oil passage L-25 communicates with the drain port. However, the second B-1 apply control valve 62 is placed at the left half position by the hydraulic pressure from the oil passage L-66 and the communication between the oil passages L-67 and L-71 is, therefore, maintained. As a result, the hydraulic pressure within the hydraulic servo B-1 is drained through the oil passage L-83, the first B-1 apply control valve 71, the oil passages L-72 and L-71, the second B-1 apply control valve 62 and the oil passages L-67 and L-25.

Hence, the first speed at which engine brake is not effected can be attained.

Next, a description will be given for a case where a failure occurs to either the second solenoid valve SL2 or the C-0 control valve 64.

In this case, hydraulic pressure is supplied to the oil passage L-37 and then supplied to the clutch apply control valve 66 through the oil passage L-52. At the second speed, the hydraulic pressure is supplied from the C-1 control valve. As a result, the clutch apply control valve 66 is placed at the left half position by the hydraulic pressure from the oil passage L-54 or L-55. The hydraulic pressure of the oil passage L-52 is, therefore, supplied to the hydraulic servo C-0 through the oil passage L-53. The hydraulic pressure supplied to the hydraulic servo C-0 as well as the first brake B1 engagement pressure and the first clutch C-1 engagement pressure functions to switch the position of the first B-1 apply control valve 71 to the right half position. Then, this switching force surpasses that for placing the first B-1 apply control valve 71 at the left half position. The position of the first B-1 apply control valve 71 is, therefore, switched to the right half position. As a result, the communication between the oil passages L-72 and L-83 is shut off and the hydraulic servo B-1 communicates with the drain port through the oil passage L-83, thereby disengaging the first brake B1.

Furthermore, by switching the first B-1 apply control valve 71, the D range pressure $P_D$ supplied to the oil passage L-91 is supplied to the clutch apply control valve 66 through the oil passage L-92 and functions to place the clutch control valve 66 at the right half position. In addition, the hydraulic servo C-0 engagement pressure is supplied to the B-2 apply control valve 67 supplied with the first brake B1 engagement pressure, so that the B-2 apply control valve 67 is maintained at the left half position as well.

Hence, the third speed can be attained.

Next, a description will be given of a case where failure occurs to either the third solenoid valve SL3 or the C-1 control valve 57.

In this case, the communication between the oil passages L-34 and L-35 is shut off and the oil passage L-35 communicates with the drain port. Supply of hydraulic pressure, which has allowed the clutch apply control valve 66 to be placed at the left half position, to the oil passages L-54 and L-55 is, thereby, stopped and the position of the clutch apply control valve 66 is switched to the right half position. When the position of the valve 66 is switched to the right half position, the oil passages L-61 and L-62 and the oil passages L-57 and L-53 are in communication with each other, respectively, and D range pressure $P_D$ is supplied to the hydraulic servos C-0 and C-1. Also, the hydraulic pressure supplied to the hydraulic servos B-1, C-0 and C-1 functions to switch the position of the B-1 apply control valve 71 to the right half position. As a result, the force for switching the position of the first B-1 apply control valve 71 to the right half position surpasses that for placing the valve 71 at the left half position. The position of the first B-1 apply control valve 71 is, therefore, switched to the right half position. As a result, the communication between the oil passages L-72 and L-83 is shut off and the hydraulic servo B-1 communicates with the drain port through the oil passage L-83, thereby disengaging the first brake B-1.

Moreover, when the first B-1 apply control valve 71 is switched, the D range pressure $P_D$ supplied to the oil passage L-91 is supplied to the clutch apply control valve 66 through the oil passage L-92 and functions to place the clutch control valve 66 at the right half position. In addition, the B-2 apply control valve 67, which has been supplied with the first brake B1 engagement pressure, is also supplied with the fourth clutch C0 engagement pressure and is, therefore, maintained at the left half position as well.

Hence, the third speed can be attained.

Next, the third speed will be described.

At the third speed, the first clutch C1, the fourth clutch C0 and the third brake B3 are engaged in a normal state. First, a description will be given for a case where failure occurs to either the sixth solenoid valve DSL or the B-2 control valve 65.

In this case, hydraulic pressure is supplied to the oil passage L-41 and functions to place the B-2 apply control valve 67 at the right half position through the oil passage L-45. As a result, a force for switching the position of the B-2 apply control valve 67 to the right half position (the product of the hydraulic pressure supplied through the oil passage L-45 and the area of the surface of the spool a applied with the hydraulic pressure+the product of the hydraulic pressure supplied to the hydraulic servo C-0 through the oil passage L-96 and the area of the surface of the spool a applied with the hydraulic pressure) surpasses that for placing the valve 67 at the left half position (the product of the line pressure $P_L$ supplied through the oil passage L-93 and the area of the surface of the spool b applied with the line pressure $P_L$). The B-2 apply control valve 67 is, therefore, placed at the right half position. Accordingly, even if a failure causes the supply of hydraulic pressure to the oil passage L-41, the communication between the oil passages L-44 and L-95 is shut off and the hydraulic servo B-2 communicates with the drain port through the oil passage L-95 by switching the B-2 apply control valve 67.

Hence, the third speed can be maintained.

Next, a description will be given of a case where failure occurs to either the first solenoid valve SL1 or the B-1 control valve 55.

In this case, the oil passages L-24 and the L-25 are in communication with each other and hydraulic pressure is supplied to the second B-1 apply control valve 62 through the oil passage L-67. The second B-1 apply control valve 62 is placed at the left half position by the hydraulic pressure supplied from the oil passage L-66 and the hydraulic pressure is, therefore, supplied to the oil passage L-71. The hydraulic pressure supplied to the oil passage L-71 functions, through the oil passage L-73, to switch the position of the first B-1 apply control valve 71 to the right half position. While the first B-1 apply control valve 71 has been already supplied with the first clutch C1 engagement pressure and the fourth clutch C0 engagement pressure through the oil passages L-86 and L-87, the hydraulic pressure supplied from the oil passage L-73 is also supplied to the valve 71. Therefore, a force for switching the position of the first B-1 apply control valve 71 to the right half position surpasses that for placing the valve 71 at the left half position and the position of the first B-1 apply control valve 71 is, therefore, switched to the right half position. Accordingly, the communication between the oil passages L-72 and L-83 is shut off and the hydraulic servo B-1 is not supplied with hydraulic pressure.

Further, when the first B-1 apply control valve 71 is switched, the D range pressure $P_D$ supplied to the oil passage L-91 is supplied to the clutch apply control valve 66 through the oil passage L-92 and functions to place the clutch apply control valve 66 at the right half position.

Hence, the third speed can be attained.

Next, a description will be given for a case where a failure occurs to either the second solenoid valve SL2 or the C-0 control valve 64.

In this case, the communication between the oil passages L-36 and L-37 is shut off and the oil passage L-37 communicates with the drain port through the C-0 control valve 64. The clutch apply control valve 66 is maintained at the left half position by the hydraulic pressure supplied from the oil passages L-54 and L-55, so that the oil passages L-52 and L-53 are in communication with each other. The hydraulic servo C-0 is, therefore, drained through the oil passage L-53, the clutch apply control valve 66 and the oil passages L-52 and L-37.

Hence, the first speed at which engine brake is not effected can be attained.

Next, a description will be given for a case where the failure occurs to either the third solenoid valve SL3 or the C-1 control valve 57.

In this case, the communication between the oil passages L-34 and L-35 is shut off and the oil passage L-35 is communicated with the drain port. Since the clutch apply control valve 66 is maintained at the left half position by the hydraulic pressure supplied from the oil passage L-51, the communication between the oil passages L-56 and L-57 is maintained. The hydraulic pressure within the hydraulic servo C-1 is, therefore, drained through the oil passages L-58 and L-57, the clutch apply control valve 66 and the oil passages L-56 ad L-35, thereby disengaging the first clutch C1.

Further, when the hydraulic pressure within the hydraulic servo C-1 is drained, the hydraulic pressure for maintaining the second B-1 apply control valve 62 at the left half position is drained and the position of the valve 62 is switched to the right half position. As a result, the oil passages L-68 and L-71 are in communication with each other and the D range pressure $P_D$ of the oil passage L-68 functions to switch the position of the first B-1 apply control valve 71 to the right half position through the oil passages L-71 and L-73. However, because the hydraulic servo C-1 is drained, a force for switching the position of the first B-1 apply control valve 71 to the right half position is solely based on the hydraulic pressure supplied from the oil passages L-86 and L-73 and the force is surpassed by that for switching the position of the first B-1 apply control valve 71 to the left half position. The first B-1 apply control valve 71 is, therefore, maintained at the left half position.

Accordingly, the oil passages L-72 and L-83 are communicated with each other and the D range pressure $P_D$ is supplied to the hydraulic servo B-1, thereby engaging the first brake B1.

Moreover, the hydraulic pressure supplied to the hydraulic servo C-0 through the oil passage L-96 and that supplied to the hydraulic servo B-1 through the oil passage L-97 function to switch the position of the B-2 apply control valve 67 to the right half position. As a result, the force for switching the position of the valve 67 to the right half position surpasses that for maintaining the valve 67 at the left half position. The position of the B-2 apply control valve 67 is, therefore, switched to the right half position.

Hence, the fourth speed can be attained.

Next, the fourth speed will be described.

At the fourth speed, the fourth clutch C0, the first brake B1 and the third brake B3 are engaged in a normal state.

First, a description will be given of a case where a failure occurs to either the sixth solenoid valve DSL or the B-2 control valve 65.

In this case, hydraulic pressure is supplied to the oil passage L-41 and then supplied to the B-2 apply control valve 67 through the oil passage L-44. However, because the position of the B-2 apply control valve 67 has been already switched to the right half position in a normal state, the communication between the oil passages L-44 and L-95 is suppressed by the spool of the B-2 apply control valve 67 and the hydraulic pressure within the hydraulic servo B-2 is drained.

Hence, the fourth speed can be maintained.

Next, a description will be given for a case where a failure occurs to either the first solenoid valve SL1 or the B-1 control valve 55.

In this case, the communication between the oil passages L-24 and L-25 is shut off and the hydraulic pressure of the hydraulic servo B-1 is drained through the oil passage L-83, the first B-1 apply control valve 71, the oil passages L-72 and L-71, the second B-1 apply control valve 62 and the oil passages L-67 and L-25. As a result, the hydraulic pressure which has functioned to place the second B-1 apply control valve 62 at the left half position is drained through the oil passage L-63 or L-64 and the position of the second B-1 apply control valve 62 is switched to the right half position.

Then, the oil passages L-68 and L-71 are communicated with each other. In this case, the D range pressure $P_D$ instead of the B-1 control pressure $P_{B1}$ is supplied to the oil passage L-71 and neither the first B-1 apply control valve 71 nor the B-2 apply control valve 67 are switched.

Hence, the fourth speed can be maintained.

Next, a description will be given for a case where a failure occurs to either the second solenoid valve SL2 or the C-0 control valve 64.

In this case, the communication between the oil passages L-36 and L-37 is shut off and the oil passage L-37 communicates with the drain port through the C-0 control valve 64. As a result, the hydraulic pressure within the hydraulic valve C-0 is drained through the oil passage L-53, the clutch apply control valve 66 and the oil passages L-52 and L-37. Supply of the hydraulic pressure, which has functioned to maintain the clutch apply control valve 66 at the left half position, to the oil passage L-51 is stopped and the position of the clutch apply control valve 66 is, thereby, switched to the right half position. As a result, the oil passages L-61 and L-62 and the oil passages L-57 and L-53 are in communication with each other, respectively and the D range pressure $P_D$ is supplied to the hydraulic servos C-0 and C-1. At the same time, a force for switching the position of the first B-1 apply control valve 71 to the right half position functions through the oil passages L-86 and L-87. This switching force allows the first B-1 apply control valve 71 to be supplied with hydraulic pressure from oil passages L-73, L-86 and L-87, and surpasses that for placing the first B-1 apply control valve 71 at the left half position, therefore, the first B-1 apply control valve 71 is switched to the right half position. As a result, the hydraulic pressure within the hydraulic servo B-1 communicates with the drain port through the oil passage L-83 and the first B-1 apply control valve 71, thereby disengaging the first brake B1.

Further, when the first B-1 apply control valve 71 is switched, the D range pressure $P_D$ supplied to the oil passage L-91 is supplied to the clutch apply control valve 66 through the oil passage L-92 and functions to place the clutch apply control valve 66 at the right half position. Thereafter, the hydraulic pressure supplied to the oil passage L-97 is drained. The hydraulic pressure, which functions to place the B-2 apply control valve 67 at the right half position, is only the hydraulic pressure supplied from the oil passage L-96. Besides, a force for maintaining the B-2 apply control valve 67 at the right half position is surpassed by that for placing the valve 67 at the left half position. Due to this, the position of the B-2 apply control valve 67 is switched to the left half position.

Hence, the third speed can be attained.

Next, a description will be given for a case where a failure occurs to either the third solenoid valve SL3 or the C-1 control valve 57.

In this case, the oil passages L-34 and L-35 are in communication with each other and hydraulic pressure is supplied to the clutch apply control valve 66 through the oil passages L-35 and L-56. Because the clutch apply control valve 66 is placed at the left half position, the oil passages L-56 and L-57 are in communication with each other and hydraulic pressure is supplied to the hydraulic servo C-1 through the oil passage L-58. Also, the hydraulic pressure supplied to the hydraulic servo C-1 is supplied to the first B-1 apply control valve 71 through the oil passages L-65 and L-87 and functions to switch the position of the valve 71 at the right half position. As a result, a force for switching the position of the first B-1 apply control valve 71 to the right half position surpasses that for maintaining the valve 71 at the left half position. The first B-1 apply control valve 71 is, therefore, placed at the right half position. Accordingly, the communication between the oil passages L-72 and L-83 is shut off and the hydraulic servo B-1 communicates with the drain port through the oil passages L-83 and the B-1 apply control valve 71, thereby disengaging the first brake B-1.

Further, when the first B-1 apply control valve 71 is switched, the D range pressure $P_D$ supplied to the oil passage L-91 is supplied to the clutch apply control valve 66 through the oil passage L-92 and functions to place the valve 66 at the right half position. Then, the hydraulic pressure supplied to the oil passage L-97 is drained. The hydraulic pressure which functions to place the B-2 apply control valve 67 at the right half position is, as a result, only the hydraulic pressure supplied from the oil passage L-96. A force for maintaining the B-2 apply control valve 67 at the right half position is surpassed by that for maintaining the valve 67 at the left half position. Thus, the position of the B-2 apply control valve 67 is switched to the left half position.

Hence, the third speed can be attained.

Next, the fifth speed will be described.

At the fifth speed, by the switching of the 4–5 shift valve, the third brake B3 is disengaged and the third clutch C3 is engaged. The remaining operations are the same as those at the fourth speed and the operation when failure occurs is, therefore, the same as that at the fourth speed.

It is noted that this embodiment is intended to attain a predetermined gear ratio to ensure that power is transmitted by the automatic transmission 11; however, it is also possible to attain other arbitrary gear ratios.

Next, a second embodiment according to the invention will be described. The same constituent elements as those in the first embodiment are denoted by the same reference symbols and description thereof will not be given herein. It is also noted that FIG. 4 is used as the left half view of a hydraulic circuit in this embodiment.

Figure 5:
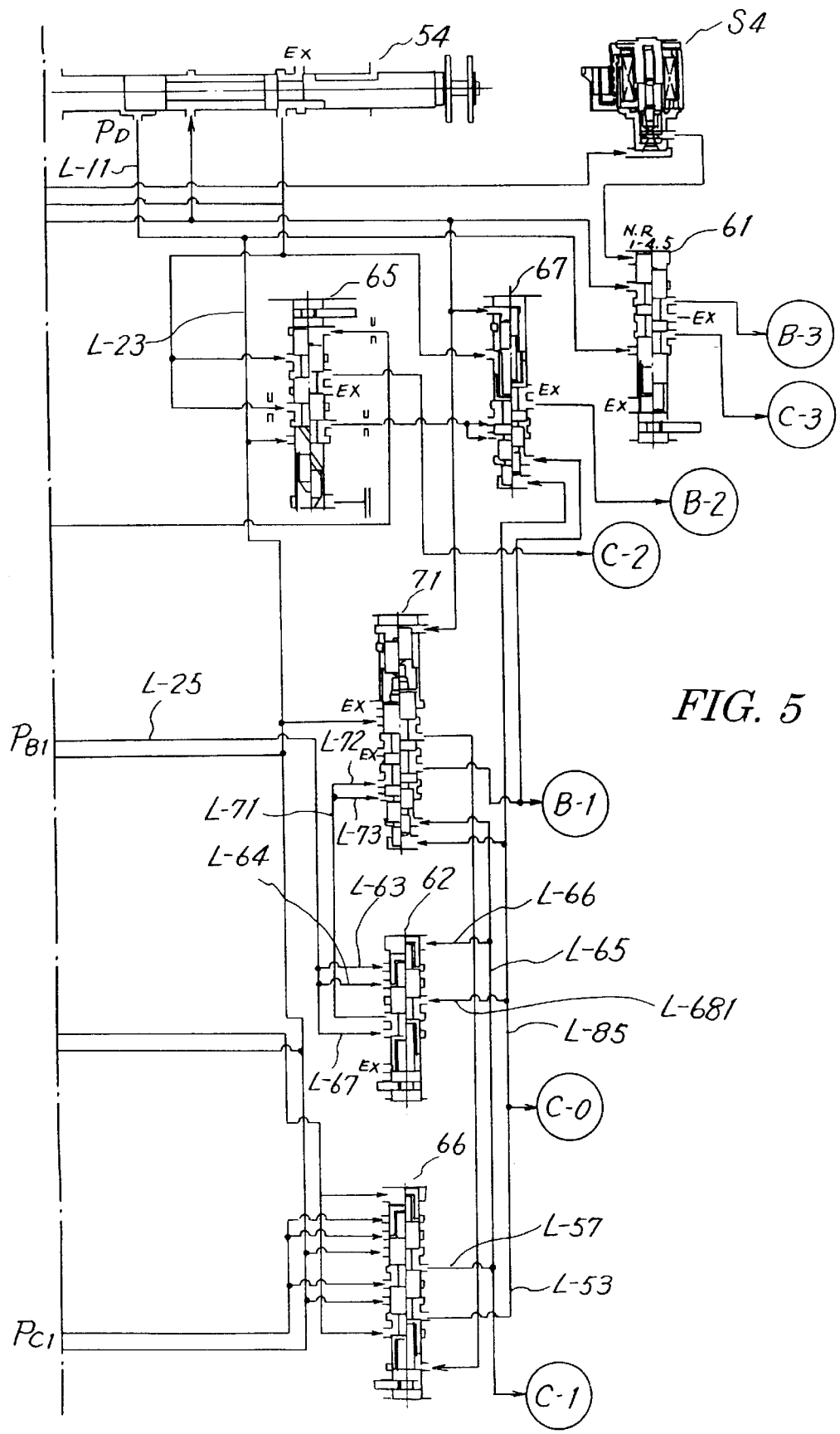
FIG. 5 is a right half view showing a hydraulic circuit in the second embodiment according to the invention.

FIG. 5 is a right half view showing a hydraulic circuit in the second embodiment according to the invention.

In this case, the second B-1 apply control valve 62 serving as fail-safe means is selectively placed at a left half position as the first position and a right half position as the second position. The second B-1 apply control valve 62 is placed at the left half position by either being supplied with the B-1 control pressure $P_{B1}$ through the oil passages L-25 and L-63 or the oil passages L-25 and L-64 or by being supplied with hydraulic pressure (C-1 control pressure $P_{C1}$ or D range pressure $P_D$) supplied to the hydraulic servo C-1 through the oil passages L-65 and L-66. The second B-1 apply control valve 62 then supplies the B-1 control pressure $P_{B1}$ supplied through the oil passages L-25 and L-67 to the first B-1 apply control valve 71 through the oil passage L-71. The second B-1 apply control valve 62 consists of a switching valve.

In the first embodiment, when failure occurs, D range pressure $P_D$ is used as the hydraulic pressure supplied following the switching of the second B-1 apply control valve 62. In this embodiment, the hydraulic pressure supplied to the hydraulic servo C-0 is supplied to the second B-1 apply control valve 62 through the oil passages L-85 and L-101.

If the second B-1 apply control valve 62 is placed at the right half position, oil passages L-681 and L-71 are in communication with each other and the hydraulic pressure supplied to the hydraulic servo C-0 is supplied to the oil passages L-72 and L-73. Also, if the second B-1 apply control valve 62 is placed at the left half position, the communication between the oil passages L-681 and L-71 is shut off. It is noted that the switching of the position of the second B-1 apply control valve 62 is the same as that in the first embodiment.

Next, a third embodiment according to the invention will be described. It is noted that the same constituent elements as those in the first embodiment are denoted by the same reference symbols and description thereof will not be given herein.

Figure 6:
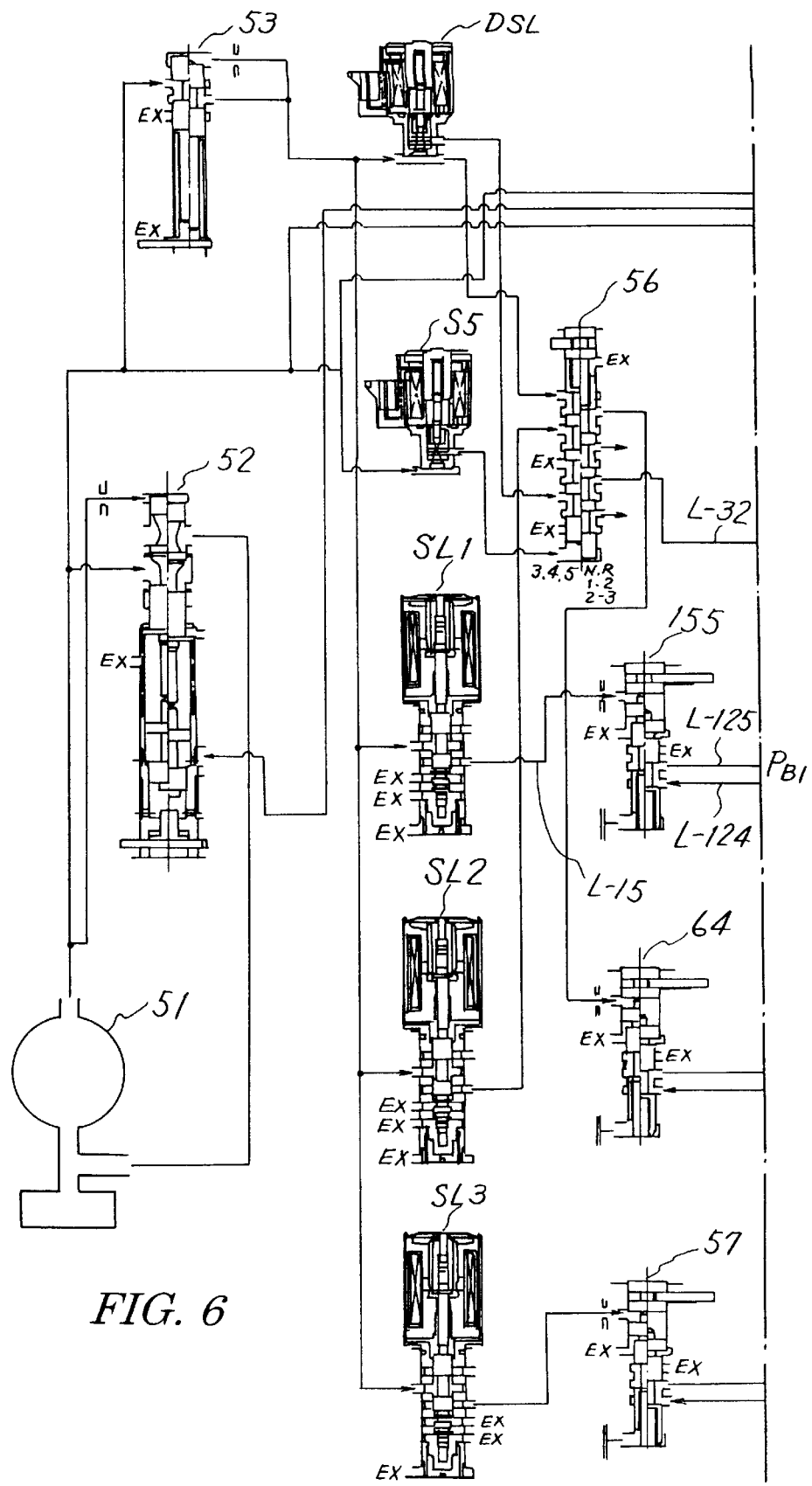
FIG. 6 is a left half view showing a hydraulic circuit in the third embodiment according to the invention.
Figure 7:
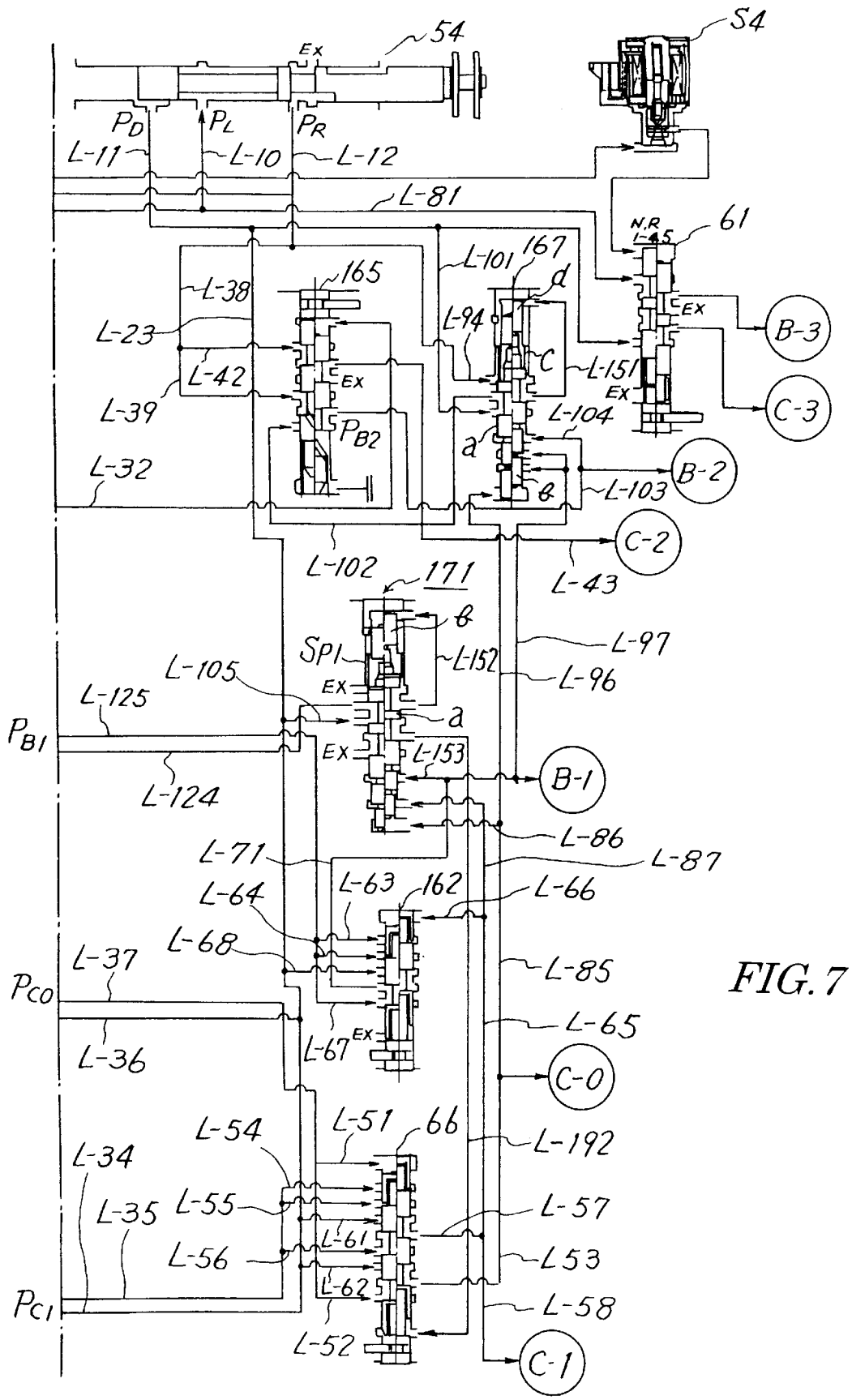
FIG. 7 is a right half view showing the hydraulic circuit in the third embodiment according to the invention.

FIG. 6 is a left half view showing a hydraulic circuit in the third embodiment according to the invention and FIG. 7 is a right half view showing the hydraulic circuit in the third embodiment according to the invention.

In the first embodiment, the relationship between the B-2 control valve 65 and the B-1 control valve 55, and that between the B-2 apply control valve 67 and the first B-1 apply control valve 71 are such that the B-2 control valve 65 and the B-1 control valve 55 regulate the D range pressure $P_D$ to thereby generate B-2 control pressure $P_{B2}$ and B-1 control pressure $P_{B1}$ and that if a failure occurs, supply of the B-2 control pressure $P_{B2}$ and B-1 control pressure $P_{B1}$ to a predetermined hydraulic servo is stopped. In this embodiment, by contrast, a B-2 apply control valve 167 and the first B-1 apply control valve 171 serving as shutoff valves of the invention are disposed upstream of the B-2 control valve 165 and B-1 control valve 155, and D range pressure $P_D$ as original pressure for generating B-2 control pressure $P_{B2}$ and B-1 apply control pressure $P_{B1}$ is supplied to the B-2 control valve 165 and the B-1 control valve 155 through the B-2 apply control valve 167 and the first B-1 apply control valve 171. When a failure occurs, the B-2 apply control valve 167 and the first B-1 apply control valve 171 are switched, thereby stopping supply of the D range pressure $P_D$ to the B-2 control valve 165 and the B-1 control valve 155.

Further, the B-2 apply control valve 167 is placed at a left half position as an apply position or a right half position as a shutoff position and provided with spools a, b and d such that the spools a and b, and b and d, are freely contacted or separated. A spring c is arranged between the spools a and b and the spools a and b are urged against the left half position side by the load of the spring c. The B-2 apply control valve 167 is placed at the left half position by the spring c and supplies the D range pressure $P_D$ supplied to the B-2 apply control valve 167 through oil passages L-11 and L-101 and further to the end portion of the B-2 apply control valve 167 through an oil passage L-151 to be placed at the left half position. The D range pressure $P_D$ supplied through the oil passages L-11 and L-101 is supplied to the B-2 control valve 165 through an oil passage L-102 and also supplied, as an opposite hydraulic pressure, to a control oil chamber through an oil passage L-151 formed to be communicated with the oil passage L-102. In this case, because the oil passage L-151 is formed to communicate with the oil passage L-102, it is possible to reduce the number of oil passages by one. Namely, if the opposite hydraulic pressure is formed in the oil passage L-101 upstream of the B-2 apply control valve 167, failure occurs and thereby the B-2 apply control valve 167 is switched, and the hydraulic pressure for maintaining the valve 167 in a normal state (at the left half position) is maintained as it is even with supply of the hydraulic pressure to the B-2 control valve 165 being shut off Thus, the hydraulic passage for maintaining the B-2 control valve 165 in a failure state (at the right half position) at the time of the occurrence of failure is required. In this embodiment, however, the oil passage is not necessary and the hydraulic circuit can be simplified. In addition, due to use of the D range pressure constantly maintained at predetermined hydraulic pressure as the opposite hydraulic pressure, it is possible to ensure that the opposite hydraulic pressure is generated facing the spool a.

The hydraulic pressure supplied to the B-2 apply control valve 167 through oil passages L-85 and L-96 functions to switch the positions of the spools a and b of the B-2 apply control valve 167 to the right half positions. In this case, the cross section area of the spool a on which the hydraulic pressure supplied to the B-2 apply control valve 167 through the oil passage L-97 acts is equal to that of the spool b on which the hydraulic pressure supplied to the B-2 apply control valve 167 through the oil passage L-96 acts. As a result, if a comparison is made between a case where one of the servo B-1 engagement pressure and the servo C-0 engagement pressure acts on the valve 167 and a case where both the hydraulic servos B-1 and C-0 act thereon, a force for switching the position of the spool a to the right half position is equal.

Further, if the R range is selected by the driver's operation, the R range pressure $P_R$ supplied through the oil passages L-12 and L-94 fictions as hydraulic pressure for placing the B-2 apply control valve 167 at the left half position, thereby ensuring that the valve 167 is fixed to the left half position.

The B-2 control valve 165 is supplied with signal hydraulic pressure through the oil passage L-32, regulates the D range pressure $P_D$ supplied through the oil passage L-102, generates B-2 control pressure $P_{B2}$, supplies the pressure $P_{B2}$ to the hydraulic servo B-2 through the oil passage L-103 and to the B-2 apply control valve 167 through the oil passage L-104 to switch the position of the spool a to the right half position.

In addition, at the B-2 apply control valve 167, the hydraulic pressure supplied to the hydraulic servo B-1 is supplied to an oil chamber between the spools a and b and that supplied to the hydraulic servo C-0 is supplied to an oil chamber below the spool b according to FIG. 6, whereby the cross section areas of the surfaces of the spools a and b applied with the respective hydraulic pressure are equal to each other. As a result, even if hydraulic pressure is supplied to the hydraulic servos B-1 and C-0 (at fourth and fifth speeds), a force for switching the position of the B-2 apply control valve 167 to the right half position is the same as that in a case where hydraulic pressure is supplied to one of the hydraulic servos B-1 and C-0 (at the second and third speeds), so that the position of the B-2 apply control valve 167 is not switched to the right half position.

That is to say, in a normal state, the oil passage from the B-2 control valve 165 to the hydraulic servo B-2 is always secured. Thus, when the L range is selected, it is possible to promptly engage the second brake B2 for engine brake at the first speed. If the spool a which is not divided is used as in the case of the B-2 apply control valve 67 described in the first and second embodiments, the position of the B-2 apply control valve 167 is switched to the right half position upon attaining the fourth or fifth speed. As a result, no hydraulic pressure is supplied to the oil passage L-151 (FIG. 7). Thereafter, even if the gear ratio is shifted down to the third or second, the B-2 apply control valve 167 remains at the right half position. If, for example, the L range is selected at such a second speed, the oil passage between the B-2 control valve 165 and the hydraulic servo B-2 cannot be formed until the hydraulic pressure of the hydraulic servo B-1 is drained to some extent. This results in the deterioration of response characteristics when the L range is selected.

Next, the first B-1 apply control valve 171 serving as a shutoff valve of the invention is placed at a left half position as an apply position or a right half position as a shutoff position and is provided with spools a and b and with a spring SP1 between the spools a and b. The first B-1 apply control valve 171 is normally placed at the left half position by the urging force of the spring SP1, supplies the D range pressure $P_D$ supplied to the first B-1 apply control valve 171 through the oil passages L-11, L-23 and L-105 to the B-1 control valve 155 through the oil passage L-124, and supplies the D range pressure $P_D$, as an opposite hydraulic pressure, to the control oil chamber of the first B-1 apply control valve 171 through an oil passage L-152 formed separately from an oil passage L-124, thereby urging the spool a against the left half position side. In this case, the oil passage L-152 is formed separately from the oil passage L-124, so that the number of oil passages can be reduced by one. It is, therefore, possible to make the hydraulic circuit simple. In addition, because the D range pressure constantly maintained at predetermined pressure is used as the opposite hydraulic pressure, it is possible to ensure that the opposite hydraulic pressure faces the spool a.

The B-1 control valve 155 is supplied with signal hydraulic pressure through the oil passage L-15, regulates the D range pressure $P_D$ supplied through the oil passage L-124, generates B-1 control pressure $P_{B1}$ and supplies the pressure $P_{B1}$ to the second B-1 apply control valve 162 serving as fail-safe means through an oil passage L-125.

The second B-1 apply control valve 162 is selectively placed at a left half position as the first position and a right half position as the second position. The second B-1 apply control valve 162 is supplied with either B-1 control pressure $P_{B1}$ through the oil passages L-125 and L-63 or the oil passages L-125 and L-64 or hydraulic pressure (C-1 control pressure $P_{C1}$ or D range pressure $P_D$) supplied to the hydraulic servo C-1 of the first clutch C1 through the oil passages L-65 and L-66 to be thereby placed at the left half position, supplies the B-1 control pressure $P_{B1}$ supplied through the oil passages L-125 and L-67 to the hydraulic servo B-1 of the first brake B1 through the oil passage L-71 and to the first B-1 apply control valve 171 through the oil passages L-71 and L-153, and functions to switch the position of the first B-1 apply control valve 171 to the right half position. Further, the hydraulic pressure supplied to the hydraulic servo B-1 is supplied between the spools a and b of the B-2 apply control valve 167 through the oil passage L-97 to thereby function to switch the position of the spool a to the right half position.

In addition, the second B-1 apply control valve 162 and the clutch apply control valve 66 serving as fail-safe means of the invention operates in the same manner as those in the first embodiment. However, because the B-2 apply control valve 167 is different in shape, the hydraulic pressure supplied to the hydraulic servo C-0 acts on the B-2 apply control valve 167 differently from that in the first embodiment. That is, in this embodiment, the hydraulic pressure supplied to the B-2 apply control valve 167 through the oil passages L-85 and L-96 functions to switch the positions of the spools a and b of the B-2 apply control valve 167 to the right half positions. However, because the cross section area of the spool a on which the hydraulic pressure supplied to the B-2 apply control valve 167 through the oil passage L-97 acts, is equal to that of the spool b on which the hydraulic pressure supplied to the valve 167 through the oil passage L-96 acts, a force for switching the position of the spool a to the right half position is equal if a comparison is made between a case where one of the hydraulic servo B-1 engagement pressure and the hydraulic servo C-0 engagement pressure acts on the valve 167 and a case where both the hydraulic servo B-1 engagement pressure and the C-0 engagement pressure acts thereon.

Next, a description will be given of the operations of the respective valves when a failure occurs.

Because the second B-1 apply control valve 162 and the clutch apply control valve 66 operate in the same manner as those in the first embodiment, the operation of the B-2 apply control valve 167 and that of the first B-1 apply control valve 171 will be described herein. The conditions for switching the positions of the B-2 apply control valve 167 and the first B-1 apply control valve 171 to the right half positions are almost the same as those in the first embodiment except that the B-2 apply control valve 167 is structured such that the position of the valve 167 is switched to the right half position only when a failure occurs. That is, the position of the B-2 apply control valve 167 and that of the first B-1 apply control valve 171 are switched to the right half positions a total of eleven times, i.e., when a failure occurs to the first solenoid valve SL1 or the B-1 control valve 155, to the second solenoid valve SL2 or the C-0 control valve 164 and to the third solenoid valve SL3 or the C-1 control valve 157 at the first speed in the L range, when a failure occurs to the sixth solenoid valve DSL or the B-2 control valve 165, to the second solenoid valve SL2 or the C-0 control valve 164 and to the third solenoid valve SL3 or the C-1 control valve 157 at the second speed, and when a failure occurs to the sixth solenoid valve DSL or the B-2 control valve 165 and to the first solenoid valve SL1 or the B-1 control valve 155 at the third speed and when a failure occurs to the sixth solenoid valve DSL or the B-2 control valve 165, to the second solenoid valve SL2 or the C-0 control valve 164 and the third solenoid valve SL3 or the C-1 control valve 157 at the fourth speed.

Next, the operations of the respective valves will be described.

First, at the first speed in the L range, when a failure occurs to either the first solenoid valve SL1 or the B-1 control valve 155, D range pressure $P_D$ supplied through the oil passages L-11, L-23 and L-105, the first B-1 apply control valve 171 and the oil passage L-124 is supplied to the second B-1 apply control valve 162 through the oil passages L-125 and L-67. The hydraulic pressure supplied to the hydraulic servo C-1 functions to place the second B-1 apply control valve 162 at the left half position. As a result, the oil passages L-67 and L-71 are communicated with each other and the B-1 control pressure $P_{B1}$ is supplied to the hydraulic servo B-1, thereby engaging the first brake B1.

Hydraulic pressure supplied to the hydraulic servo B-1 is supplied to the first B-1 apply control valve 171 through an oil passage L-153 and functions to place the first B-1 apply control valve 171 at the right half position. However, a force for switching the position of the first B-1 apply control valve 171 to the right half position (the product of the hydraulic pressure supplied to the hydraulic servo B-1 through the oil passage L-153 and the area of the surface of the spool a applied with the hydraulic pressure+the product of the hydraulic pressure supplied to the hydraulic servo C-1 through the oil passage L-87 and the area of the surface of the spool a applied with the hydraulic pressure) is surpassed by that for maintaining the valve 171 at the left half position (the load of the spring SP1+the product of the D range pressure $P_D$ supplied through the oil passage L-152 and the area of the surface of the spool b applied with the D range pressure $P_D$). Thus, the first B-1 apply control valve 171 is maintained at the left half position.

Further, the hydraulic pressure supplied to the hydraulic servo B-1 is supplied to the B-2 apply control valve 167 through the oil passage L-97 and functions to place the spool a of the B-2 apply control valve 167 at the right half position. As a result, a force for switching the position of the B-2 apply control valve 167 to the right half position (the product of the hydraulic pressure supplied to the hydraulic servo B-1 through the oil passage L-97 and the area of the surface of the spool a applied with the hydraulic pressure+the product of the hydraulic pressure supplied to the hydraulic servo B-2 through the oil passage L-104 and the area of the surface of the spool a applied with the hydraulic pressure) surpasses that for maintaining the valve 167 at the left half position (the load of the spring c+the product of the D range pressure $P_D$ supplied through the oil passage L-151 and the area of the surface of the spool d applied with the D range pressure $P_D$). Thus, the position of the B-2 apply control valve 167 is switched to the right half position. When the position of the valve 167 is switched to the right half position, the communication between the oil passages L-101 and L-102 is shut off and supply of the D range pressure $P_D$ as the original pressure of the B-2 control pressure $P_{B2}$ to the B-2 control valve 165 is stopped.

The hydraulic servo B-2 communicates with the drain port through the oil passage L-103, the B-2 control valve 165, the oil passage L-102, the B-2 apply control valve 167, the oil passages L-94 and L-12 and the manual valve 54, thereby disengaging the second brake B2. When the position of the B-2 apply control valve 167 is switched to the right half position, the hydraulic pressure within the oil passage L-104 is drained. Thus, a force for switching the position of the B-2 apply control valve 167 to the right half position becomes only a force related to the hydraulic servo B-1. However, the communication between the oil passages L-151 and L-101 is shut off, the oil passages L-151 and L-94 are communicated with each other and the oil passage L-94 is communicated with the drain port through the oil passage L-12 and the manual valve 54. Due to this, a force for switching the position of the B-2 apply control valve 167 to the left half position becomes only the load of the spring c. As a result, a force for placing the B-2 apply control valve 167 at the right half position (the product of the hydraulic pressure supplied to the hydraulic servo B-1 through the oil passage L-97 and the area of the surface of the spool a applied with the hydraulic pressure) surpasses that for switching the position of the valve 167 to the left half position (the load of the spring c). Thus, the B-2 apply control valve 167 is maintained at the right half position.

Hence, the second speed can be attained.

Next, when failure occurs to either the second solenoid valve SL2 or the C-0 control valve 164, the oil passages L-36 and the L-37 are in communication with each other and hydraulic pressure within the oil passage L-52 is supplied to the clutch apply control valve 66. Because the clutch apply control valve 66 is placed at the left half position by the function of the C-1 control pressure $P_{C1}$ the hydraulic pressure of the oil passage L-52 is supplied to the hydraulic servo C-0 through the oil passage L-53, thereby engaging the fourth clutch C0.

Moreover, the hydraulic pressure supplied to the hydraulic servo C-0 is supplied to the first B-1 apply control valve 171 through the oil passages L-85 and L-86 and functions to place the first B-1 apply control valve 171 at the right half position. However, a force for switching the position of the first B-1 apply control valve 171 to the right half position (the product of the hydraulic pressure supplied to the hydraulic servo C-0 through the oil passage L-86 and the area of the surface of the spool a applied with the hydraulic pressure+the product of the hydraulic pressure supplied to the hydraulic servo C-1 through the oil passage L-87 and the area of the surface of the spool a applied with the hydraulic pressure) is surpassed by that for maintaining the valve 171 at the left half position (the load of the spring SP1+the product of the hydraulic D range pressure $P_D$ supplied through the oil passage L-152 and the area of the surface of the spool a applied with the D range pressure $P_D$). Thus, the first B-1 apply control valve 171 is maintained at the left half position.

Furthermore, the hydraulic pressure supplied to the hydraulic servo C-0 is supplied to the B-2 apply control valve 167 through the oil passages L-85 and L-96 and functions to place the valve 167 at the right half position. As a result, a force for switching the position of the B-2 apply control valve 167 to the right half position (the product of the hydraulic pressure supplied to the hydraulic servo C-0 through the oil passage L-96 and the area of the surface of the spool a applied with the hydraulic pressure+the product of the hydraulic pressure supplied to the hydraulic servo B-2 through the oil passage L-104 and the area of the surface of the spool a applied with the hydraulic pressure) surpasses that for maintaining the valve 167 at the left half position (the load of the spring c+the product of the D range pressure $P_D$ supplied through the oil passage L-151 and the area of the surface of the spool d applied with the D range pressure $P_D$). Thus, the position of the B-2 apply control valve 167 is switched to the right half position. When the position of the valve 167 is switched to the right half position, the communication between the oil passages L-101 and L-102 is shut off and supply of the D range pressure $P_D$ as the original pressure of the B-2 control pressure $P_{B2}$ to the B-2 control valve 165 is stopped.

Further, the hydraulic servo B-2 of the second brake B2 communicates with the drain port through the oil passage L-103, the B-2 control valve 165, the oil passage L-102, the B-2 apply control valve 167, the oil passages L-94 and L-12 and the manual valve 54, thereby disengaging the second brake B2. Also, when the position of the B-2 apply control valve 167 is switched to the right half position, the hydraulic pressure within the oil passage L-104 is drained. Due to this, a force for switching the position of the B-2 apply control valve 167 to the right half position becomes only a force related to the hydraulic servo C-0. However, because the communication between the oil passages L-151 and L-101 is shut off, the oil passages L-151 and L-94 are in communication with each other and the oil passage L-94 communicates with the drain port through the oil passage L-12 and the manual valve 54, the force for switching the position of the B-2 apply control valve 167 to the left half position becomes only the load of the spring c.

As a result, the force for placing the B-2 apply control valve 167 at the right half position (the product of the hydraulic pressure supplied to the hydraulic servo C-0 through the oil passage L-97 and the area of the surface of the spool b applied with the hydraulic pressure) surpasses that for switching the position of the valve 167 to the left half position (the load of the spring c). Thus, the B-2 apply control valve 167 is maintained at the right half position.

Hence, the third speed can be attained.

Next, when a failure occurs to either the third solenoid valve SL3 or the C-1 control valve 66, the communication between the oil passages L-34 and L-35 is shut off and the oil passage L-35 communicates with the drain port. As a result, as in the case of the first embodiment, the D range pressure $P_D$ is supplied to the hydraulic servos C-0 and C-1. Also, the hydraulic pressure supplied to the hydraulic servo C-0 is supplied to the first B-1 apply control valve 171 through the oil passages L-85 and L-86 and functions to place the valve 171 at the right half position. The hydraulic pressure supplied to the hydraulic servo C-1 is supplied to the first B-1 apply control valve 171 through the oil passages L-65 and L-87 and functions to place the valve 171 at the right half position. However, a force for switching the position of the first B-1 apply control valve 171 to the right half position (the hydraulic pressure supplied to the hydraulic servo C-0 through the oil passage L-86 and the area of the surface of the spool a applied with the hydraulic pressure+ the product of the hydraulic pressure supplied to the hydraulic servo C-1 through the oil passage L-87 and the area of the surface of the spool a applied with the hydraulic pressure) is surpassed by that for maintaining the valve 171 at the left half position (the load of the spring SP1+the D range pressure $P_D$ supplied through the oil passage L-152 and the area of the surface of the spool a applied with the hydraulic pressure). Thus, the B-1 apply control valve 171 is maintained at the left half position.

Further, the hydraulic pressure supplied to the hydraulic servo C-0 is supplied to the B-2 apply control valve 167 through the oil passages L-85 and L-96 and functions to place the valve 167 at the right half position.

As a result, a force for switching the position of the B-2 apply control valve 167 to the right half position (the product of the hydraulic pressure supplied to the hydraulic servo C-0 through the oil passage L-96 and the area of the surface of the spool b applied with the hydraulic pressure+the product of the hydraulic pressure supplied to the hydraulic servo B-2 through the oil passage L-104 and the area of the surface of the spool a applied with the hydraulic pressure) surpasses that for maintaining the valve 167 at the left half position (the load of the spring c+the D range pressure $P_D$ supplied through the oil passage L-151 and the area of the surface of the spool d applied with the D range pressure $P_D$). Thus, the position of the B-2 apply control valve 167 is switched to the right half position.

When the position of the B-2 apply control valve 167 is switched to the right half position, the communication between the oil passages L-101 and L-102 is shut off and supply of the D range pressure $P_D$ as the original pressure of the B-2 control pressure $P_{B2}$ to the B-2 control valve 165 is stopped. Besides, the hydraulic servo B-2 is communicated with the drain port through the oil passage L-103, the B-2 control valve 165, the oil passage L-102, the B-2 apply control valve 167, the oil passages L-94 and L-12 and the manual valve 54, thereby disengaging the second brake B2.

Furthermore, when the position of the valve 167 is switched to the right half position, the hydraulic pressure within the oil passage L-104 is drained. Due to this, the force for switching the position of the B-2 apply control valve 167 to the right half position becomes only the force related to the hydraulic servo C-0. However, because the communication between the oil passages L-151 and L-101 is shut off, the oil passages L-151 and L-94 are in communication with each other and the oil passage L-94 communicates with the drain port through the oil passage L-12 and the manual valve 54, the force for switching the position of the B-2 apply control valve 167 to the left half position is only the load of the spring c. As a result, a force for placing the B-2 apply control valve 167 at the right half position (the product of the hydraulic pressure supplied to the hydraulic servo C-0 through the oil passage L-97 and the area of the surface of the spool a applied with the hydraulic pressure) surpasses that for switching the position of the valve 167 to the left half position (the load of the spring c). Thus, the B-2 apply control valve 167 is maintained at the right half position.

Hence, the third speed can be attained.

Next, at the second speed, when a failure occurs to either the sixth solenoid valve DSL or the B-2 control valve 165, the D range pressure $P_D$ supplied to the B-2 control valve 165 through the oil passages L-1 and 1-101, the B-2 apply control valve 167 and the oil passage L-102 is supplied to the hydraulic servo B-2 through the oil passage L-103 and to the B-2 apply control valve 167 through the oil passage L-104 and functions to place the valve 167 at the right half position.

Meanwhile, at the second speed, the hydraulic pressure supplied to the hydraulic servo B-1 through the oil passage L-97 functions to switch the position of the B-2 apply control valve 167 to the right half position. As a result, a force for switching the position of the B-2 apply control valve 167 to the right half position (the product of the hydraulic pressure supplied to the hydraulic servo B-1 through the oil passage L-97 and the area of the surface of the spool a applied with the hydraulic pressure+the product of the hydraulic pressure supplied to the hydraulic servo B-2 through the oil passage L-104 and the area of the surface of the spool a applied with the hydraulic pressure) surpasses that for maintaining the valve 167 at the left half position (the load of the spring c+the product of the D range pressure $P_D$ supplied through the oil passage L-151 and the area of the surface of the spool d applied with the D range pressure $P_D$). Thus, the position of the B-2 apply control valve 167 is switched to the right half position.

When the position of the B-2 apply control valve 167 is switched to the right half position, the communication between the oil passages L-101 and L-102 is shut off and supply of the D range pressure $P_D$ as the original pressure of the B-2 control pressure $P_{B2}$ to the B-2 control valve 165 is stopped. Besides, the hydraulic servo B-2 is communicated with the drain port through the oil passage L-103, the B-2 control valve 165, the oil passage L-102, the B-2 apply control valve 167, the oil passages L-94 and L-12 and the manual valve 54, thereby disengaging the second brake B2. When the position of the B-2 apply control valve 167 is switched to the right half position, the hydraulic pressure within the oil passage L-104 is drained. As a result, the force for switching the position of the B-2 apply control valve 167 to the right half position becomes only the force related to the hydraulic servo B-1. However, because the communication between the oil passages L-151 and L-101 is shut off, the oil passages L-151 and L-94 are in communication with each other and the oil passage L-94 communicates with the drain port through the oil passage L-12 and the manual valve 54, the force for switching the position of the B-2 apply control valve 167 to the left half position is only the load of the spring c. Thus, a force for placing the B-2 apply control valve 167 at the right half position (the product supplied to the hydraulic servo B-1 through the oil passage L-97 and the area of the surface of the spool a applied with the hydraulic pressure) surpasses that for switching the position of the valve 167 to the left half position (the load of the spring c). The B-2 apply control valve 167 is, therefore, maintained at the right half position.

Hence, the second speed can be attained.

Next, when a failure occurs to either the second solenoid valve SL2 or the C-0 control valve 164, the oil passages L-36 and L-37 are in communication with each other and hydraulic pressure is supplied to the hydraulic servo C-0 through the oil passage L-52, the clutch apply control valve 66 and the oil passage L-53. Also, the hydraulic pressure supplied to the hydraulic servo C-0 is supplied to the first B-1 apply control valve 171 through the oil passages L-85 and L-86 and functions to switch the position of the valve 171 to the right half position. As a result, a force for switching the position of the first B-1 apply control valve 171 to the right half position (the product of the hydraulic pressure supplied to the hydraulic servo B-1 through the oil passage L-153 and the area of the surface of the spool a applied with the hydraulic pressure+the product of the hydraulic pressure supplied to the hydraulic servo C-1 through the oil passage L-87 and the area of the surface of the spool a applied with the hydraulic pressure+the product of the hydraulic pressure supplied to the hydraulic servo C-0 through the oil passage C-86 and the area of the surface of the spool a applied with the hydraulic pressure) surpasses that for maintaining the valve 171 at the left half position (the load of the spring SP1+the product of the D range pressure $P_D$ supplied through the oil passage L-152 and the area of the surface of the spool b applied with the hydraulic pressure). Thus, when the position of the first B-1 apply control valve 171 is switched to the right half position, the communication between the oil passages L-105 and L-124 is shut off and supply of the D range pressure $P_D$ as the original pressure of the B-1 control pressure $P_{B1}$ to the B-1 control valve 155 is stopped.

Further, the hydraulic servo B-1 communicates with the drain port through the oil passage L-71, the second B-1 apply control valve 162, the oil passages L-67 and L-125, the B-1 control valve 155, the oil passage L-124 and the first B-1 apply control valve 171, thereby disengaging the first brake B1.

When the position of the valve 171 is switched to the right half position, the hydraulic pressure within the oil passage L-153 is drained. As a result, a force for switching the position of the first B-1 apply control valve 171 to the right half position becomes only a force related to the hydraulic servos C-0 and C-1. However, because the communication between the oil passages L-152 and L-105 is shut off and the oil passage L-152 is communicated with the drain port, the force for switching the position of the first B-1 apply control valve 171 becomes only the load of the spring SP1. As a result, the force for placing the first B-1 apply control valve 171 at the right half position (the product of the hydraulic pressure supplied to the hydraulic servo C-0 through the oil passage L-86 and the area of the surface of the spool a applied with the hydraulic pressure+the product of the hydraulic pressure supplied to the hydraulic servo C-1 through the oil passage L-87 and the area of the surface of the spool a applied with the hydraulic pressure) surpasses that for switching the position of the valve 171 to the left half position (the load of the spring SP1). The first B-1 apply control valve 171 is, therefore, maintained at the right half position.

Hence, the third speed can be attained.

Next, when a failure occurs to either the third solenoid valve SL3 or the C-1 control valve 157, the position of the clutch control valve 66 is switched to the right half position and D range pressure $P_D$ is supplied to the hydraulic servos C-0 and C-1 as in the case of the first embodiment. Also, the hydraulic pressure supplied to the hydraulic servos C-0 and C-1 is supplied to the first B-1 apply control valve 171 and functions to switch the position of the valve 171 to the right half position. As a result, a force for switching the position of the first apply control valve 171 to the right half position (the product of the hydraulic pressure supplied to the hydraulic servo B-1 through the oil passage L-153 and the area of the surface of the spool a applied with the hydraulic pressure+the product of the hydraulic pressure supplied to the hydraulic servo C-1 through the oil passage L-87 and the area of the surface of the spool a applied with the hydraulic pressure+the product of the hydraulic pressure supplied to the hydraulic servo C-0 through the oil passage C-86 and the area of the surface of the spool a applied with the hydraulic pressure) surpasses that for maintaining the valve 171 at the left half position (the load of the spring SP1+the product of the D range pressure $P_D$ supplied through the oil passage L-152 and the area of the surface of the spool b applied with the D range pressure $P_D$). The position of the first B-1 apply control valve 171 is, therefore, switched to the right half position. As a result, the communication between the oil passages L-105 and L-124 is shut off and supply of the D range pressure $P_D$ as the original pressure of the B-1 control pressure $P_{B1}$ to the B-1 control valve 155 is stopped. Besides, the first B-1 control servo B-1 is communicated with the drain port through the oil passage L-71, the second B-1 apply control valve 162, the oil passages L-67 and L-125, the B-1 control valve 155, the oil passage L-124 and the first B-1 apply control valve 171, thereby disengaging the first brake B1.

When the position of the valve 171 is switched to the right half position, the hydraulic pressure within the oil passage L-153 is drained. As a result, the force for switching the position of the first B-1 apply control valve 171 to the right half position is only a force related to the hydraulic servos C-0 and C-1. However, because the communication between the oil passages L-152 and L-105 is shut off and the oil passage L-152 communicates with the drain port, the force for switching the position of the first B-1 apply control valve 171 to the left half position is only the load of the spring SP1. As a result, a force for placing the first B-1 apply control valve 171 at the right half position (the product of the hydraulic pressure supplied to the hydraulic servo C-0 through the oil passage L-86 and the area of the surface of the spool a applied with the hydraulic pressure+the product of the hydraulic pressure supplied to the hydraulic servo C-1 through the oil passage L-87 and the area of the surface of the spool a applied with the hydraulic pressure) surpasses that for switching the position of the valve 171 to the left half position (the load of the spring SP1). The first B-1 apply control valve 171 is, therefore, maintained at the right half position.

Hence, the third speed can be attained.

Next, when a failure occurs to either the sixth solenoid valve DSL or the B-2 control valve 165 at the third speed, the D range pressure $P_D$ supplied to the B-2 control valve 165 through the oil passages L-11 and L-101, the B-2 apply control valve 167 and the oil passage L-102 is supplied to the oil passage L-103 and to the hydraulic servo B-2 and also supplied to the B-2 apply control valve 167 through the oil passage L-104. The D range pressure $P_D$ functions to switch the position of the B-2 apply control valve 167 to the right half position. At the third speed, the hydraulic pressure supplied to the hydraulic servo C-0 through the oil passage L-96 functions to switch the position of the B-2 apply control valve 167 to the right half position. As a result, a force for switching the position of the B-2 apply control valve 167 to the right half position (the product of the hydraulic pressure supplied to the hydraulic servo C-0 through the oil passage L-96 and the area of the surface of the spool a applied with the hydraulic pressure+the product of the hydraulic pressure supplied to the hydraulic servo B-2 through the oil passage L-104 and the area of the surface of the spool a applied with the hydraulic pressure) surpasses that for maintaining the valve 167 at the left half position (the load of the spring c+the product of the D range pressure $P_D$ supplied through the oil passage L-151 and the area of the surface of the spool applied with the D range pressure $P_D$) The position of the B-2 apply control valve 167 is, therefore, switched to the right half position.

When the position of the B-2 apply control valve 167 is switched to the right half position, the communication between the oil passage L-101 and L-102 is shut off and the supply of the D range pressure $P_D$ as the original pressure of the B-2 control pressure $P_{B2}$ to the B-2 control valve 165 is stopped. In addition, the hydraulic servo B-2 communicates with the drain port through the oil passage L-103, the B-2 control valve 165, the oil passage L-102, the B-2 apply control valve 167, the oil passages L-94 and L-12 and the manual valve 54, thereby disengaging the second brake B2.

When the position of the valve 167 is switched to the right half position, the hydraulic pressure within the oil passage L-104 is drained. As a result, the force for switching the position of the B-2 apply control valve 167 to the right half position is only a force related to the hydraulic servo C-0. However, because the communication between the oil passages L-151 and L-101 is shut off, the oil passages L-151 and L-94 are in communication with each other and the oil passage L-94 communicates with the drain port through the oil passage L-12 and the manual valve 54, the force for switching the position of the B-2 apply control valve 167 to the left half position is only the load of the spring c. As a result, a force for placing the B-2 apply control valve 167 at the right half position (the product of the hydraulic pressure supplied to the hydraulic servo C-0 through the oil passage L-96 and the area of the surface of the spool a applied with the hydraulic pressure) surpasses that for switching the position of the valve 167 to the left half position (the load of the spring c). The B-2 apply control valve 167 is, therefore, maintained at the right half position.

Hence, the third speed can be attained.

Next, when a failure occurs to either the first solenoid valve SL1 or the B-1 control valve 155, the D range pressure $P_D$ supplied to the B-1 control valve 155 through the oil passages L-11, L-23 and L-105, the first B-1 apply control valve 171 and the oil passage L-124 is supplied to the hydraulic servo B-1 through the oil passages L-125 and L-67, the second B-1 apply control valve 162 and the oil passage L-71. Following this, the hydraulic pressure supplied to the hydraulic servo B-1 is supplied to the first B-1 apply control valve 171 through the oil passage L-153. A force for switching the position of the first B-1 apply control valve 171 to the right half position (the product of the hydraulic pressure supplied to the hydraulic servo B-1 through the oil passage L-153 and the area of the surface of the spool a applied with the hydraulic pressure+the product of the hydraulic pressure supplied to the hydraulic servo C-1 through the oil passage L-87 and the area of the surface of the spool a applied with the hydraulic pressure+the product of the hydraulic pressure supplied to the hydraulic servo C-0 through the hydraulic servo L-86 and the area of the surface of the spool a applied with the hydraulic pressure) surpasses that for maintaining the valve 171 at the left half position (the load of the spring SP1+the product of the D range pressure $P_D$ supplied through the oil passage L-152 and the area of the surface of the spool b applied with the D range pressure $P_D$). The position of the first B-1 apply control valve 171 is, therefore, switched to the right half position.

When the position of the B-1 apply control valve 171 is switched to the right half position, the communication between the oil passages L-105 and L-124 is shut off and supply of the D range pressure $P_D$ as the original pressure of the B-1 control pressure $P_{B1}$ to the B-1 control valve 155 is stopped. In addition, the hydraulic servo B-1 of the first brake B1 communicates with the drain port through the oil passage L-71, the second B-1 apply control valve 162, the oil passages L-67 and L-125, the B-1 control valve 155, the oil passage L-124 and the first B-1 apply control valve 171, thereby disengaging the first brake B1.

When the position of the first B-1 apply control valve 171 is switched to the right half position, the hydraulic pressure within the oil passage L-153 is drained and the force for switching the position of the valve 171 to the right half position is only a force related to the hydraulic servos C-0 and C-1. However, because the communication between the oil passages L-152 and L-105 is shut off and the oil passage L-152 communicates with the drain port, the force for switching the position of the first B-1 apply control valve 171 to the left half position is only the load of the spring SP1. As a result, a force for placing the first B-1 apply control valve 171 at the right half position (the product of the hydraulic pressure supplied to the hydraulic servo C-0 through the oil passage L-86 and the area of the surface of the spool a applied with the hydraulic pressure+the product of the hydraulic pressure supplied to the hydraulic servo C-1 through the oil passage L-87 and the area of the surface of the spool a applied with the hydraulic pressure) surpasses that for switching the position of the valve 171 to the left half position (the load of the spring SP1). The first B-1 apply control valve 171 is maintained at the right half position.

Hence, the third speed can be attained.

Next, when a failure occurs to either the sixth solenoid valve DSL or the B-2 control valve 165 at the fourth speed, the D range pressure $P_D$ supplied to the B-2 control valve 165 through the oil passages L-11 and L-101, the B-2 apply control valve 167 and the oil passage L-102 is supplied to the oil passage L-103, then to the hydraulic servo B-2 and also supplied to the B-2 apply control valve 167 through the oil passage L-104. The D range pressure $P_D$ functions to switch the position of the valve 167 to the right half position. At the fourth speed, the hydraulic pressure supplied to the hydraulic servo C-0 functions to switch the position of the B-2 apply control valve 167 to the right half position through the oil passage L-96. As a result, a force for switching the position of the B-2 apply control valve 167 to the right half position (the product of the hydraulic pressure supplied to the hydraulic servo C-0 through the oil passage L-96 and the area of the surface of the spool b applied with the hydraulic pressure+the product of the hydraulic pressure supplied to the hydraulic servo B-2 through the oil passage L-104 and the area of the surface of the spool a applied with the hydraulic pressure) surpasses that for maintaining the valve 167 at the left half position (the load of the spring c+the product of the D range pressure $P_D$ supplied through the oil passage L-151 and the area of the surface of the spool d applied with the hydraulic pressure). The position of the B-2 apply control valve 167 is, therefore, switched to the right half position.

When the position of the valve 167 is switched to the right half position, the communication between the oil passages L-101 and L-102 is shut off and supply of the D range pressure $P_D$ as the original pressure of the B-2 control valve $P_{B2}$ to the B-2 control valve 165 is stopped. In addition, the hydraulic servo B-2 is communicated with the drain port through the oil passage L-103, the B-2 control valve 165, the oil passage L-102, the B-2 apply control valve 167, the oil passages L-94 and L-12 and the manual valve 54, thereby disengaging the second brake B2. Then, following the switching of the position of the B-2 apply control valve 167 to the right half position, the hydraulic pressure within the oil passage L-104 is drained. As a result, the force for switching the position of the valve 167 to the right half position is only a force related to the hydraulic servo C-0. However, because the communication between the oil passages L-151 and L-101 is shut off, the oil passages L-151 and L-94 are in communication with each other and the oil passage L-94 communicates with the drain port through the oil passage L-12 and the manual valve 54, the force for switching the position of the B-2 apply control valve 167 to the left half position is only the load of the spring c. As a result, a force for placing the B-2 apply control valve 167 at the right half position (the product of the hydraulic pressure supplied to the hydraulic servo C-0 through the oil passage L-96 and the area of the surface of the spool b applied with the hydraulic pressure) surpasses that for switching the position of the valve 167 to the left half position (the load of the spring c). The B-2 apply control valve 167 is, therefore, maintained at the right half position.

Hence, the fourth speed can be attained.

Next, when a failure occurs to either the second solenoid valve SL2 or the C-0 control valve 64, the position of the clutch apply control valve 66 is switched to the right half position and D range pressure $P_D$ is supplied to the hydraulic servos C-0 and C-1 as in the case of the first embodiment. Also, the hydraulic pressure supplied to the hydraulic servos C-0 and C-1 is supplied to the first B-1 apply control valve 171 and functions to switch the position of the valve 171 to the right half position. As a result, a force for switching the position of the first B-1 apply control valve 171 to the right half position (the product of the hydraulic pressure supplied to the hydraulic servo B-1 through the oil passage L-153 and the area of the surface of the spool a applied with the hydraulic pressure+the hydraulic pressure supplied to the hydraulic servo C-1 through the oil passage L-87 and the area of the surface of the spool a applied with the hydraulic pressure+the product of the hydraulic pressure supplied to the hydraulic servo C-0 through the oil passage L-86 and the area of the surface of the spool a applied with the hydraulic pressure) surpasses that for maintaining the valve 171 at the left half position (the load of the spring SP1+the product of the D range pressure $P_D$ supplied through the oil passage L-152 and the area of the surface of the spool b applied with the D range pressure $P_D$). The position of the first B-1 apply control valve 171 is, therefore, switched to the right half position. Following the switching of the position of the valve 171 to the right half position, the communication between the oil passages L-105 and L-124 is shut off and supply of the D range pressure $P_D$ as the original pressure of the B-1 control pressure $P_{B1}$ to the B-1 control valve 155 is stopped.

Further, the hydraulic servo B-1 communicates with the drain port through the oil passage L-71, the second B-1 apply control valve 162, the oil passages L-67 and L-125, the B-1 control valve 155, the oil passage L-124 and the first B-1 apply control valve 171, thereby disengaging the first brake B1.

Then, when the position of the valve 171 is switched to the right half position, the hydraulic pressure within the oil passage L-153 is drained. As a result, the force for switching the position of the first B-1 apply control valve 171 to the right half position is only a force related to the hydraulic servos C-0 and C-1. However, because the communication between the oil passages L-152 and L-105 is shut off and the oil passage L-152 communicates with the drain port, the force for switching the position of the first B-1 apply control valve 171 to the left half position is only the load of the spring SP1. As a result, a force for placing the first B-1 apply control valve 171 at the right half position (the product of the hydraulic pressure supplied to the hydraulic servo C-0 through the oil passage L-86 and the area of the surface of the spool a applied with the hydraulic pressure+the product of the hydraulic pressure supplied to the hydraulic servo C-1 through the oil passage L-87 and the area of the surface of the spool a applied with the hydraulic pressure) surpasses that for switching the position of the valve 171 to the left half position (the load of the spring SP1). The first B-1 apply control valve 171 is, therefore, maintained at the right half position.

Hence, the third speed can be attained.

Next, when a failure occurs to either the third solenoid valve SL3 or the C-1 control valve 57, the oil passages L-34 and L35 are in communication with each other and hydraulic pressure is supplied to the hydraulic servo C-1 through the oil passage L-56, the clutch apply control valve 66 and the oil passages L-57 and L-58. Also, the hydraulic pressure supplied to the hydraulic servo C-1 is supplied to the first B-1 apply control valve 171 through the oil passages L-65 and L-87 and functions to switch the position of the first B-1 apply control valve 171 to the right half position. As a result, a force for switching the position of the first B-1 apply control valve 167 to the right half position (the product of the hydraulic pressure supplied to the hydraulic servo B-1 through the oil passage L-153 and the area of the surface of the spool a applied with the hydraulic pressure+the product of the hydraulic pressure supplied to the hydraulic servo C-1 through the oil passage L-87 and the area of the surface of the spool a applied with the hydraulic pressure+the product of the hydraulic pressure supplied to the hydraulic servo C-0 through the oil passage L-86 and the area of the surface of the spool a applied with the hydraulic pressure) surpasses that for maintaining the valve 171 at the left half position (the load of the spring SP1+the product of the D range pressure $P_D$ supplied through the oil passage L-152 and the area of the surface of the spool b applied with the D range pressure $P_D$). The position of the first B-1 apply control valve 171 is, therefore, switched to the right half position. Following the switching of the position of the valve 171 to the right half position, supply of the D range pressure $P_D$ as the original pressure of the B-1 control pressure $P_{B1}$ to the B-1 control valve 155 is stopped. Then, the hydraulic servo B-1 communicates with the drain port through the oil passage L-71, the second B-1 apply control valve 162, the oil passages L-67 and L-125, the B-1 control valve 155, the oil passage L-124 and the first B-1 apply control valve 171, thereby disengaging the first brake B1. Further, following the switching of the position of the first B-1 apply control valve 171 to the right half position, the hydraulic pressure to the oil passage L-153 is drained. Thus, the force for switching the position of the first B-1 apply control valve 171 to the right half position is only a force related to the hydraulic servos C-0 and C-1. However, because the communication between the oil passages L-152 and L-105 is shut off and the oil passage L-152 communicates with the drain port, the force for switching the first B-1 apply control valve 171 to the left half position is only the load of the spring SP1. As a result, a force for placing the first B-1 apply control valve 171 at the right half position (the product of the hydraulic pressure supplied to the hydraulic servo C-0 through the oil passage L-86 and the area of the surface of the spool a applied with the hydraulic pressure+the product of the hydraulic pressure supplied to the hydraulic servo C-1 through the oil passage L-87 and the area of the surface of the spool a applied with the hydraulic pressure) surpasses that for switching the position of the valve 171 to the left half position (the load of the spring SP1). The first B-1 apply control valve 171 is, therefore, maintained at the right half position.

Hence, the third speed can be attained.

Further, if valve sticking occurs while the first B-1 apply control valve 171 is being placed at the right half position, the communication between the oil passages L-105 and L-124 remains shut off and supply of the B-1 control pressure $P_{B1}$ to the hydraulic servo B-1 is stopped. In that case, at either the second or fourth speed, the first brake B1 cannot be engaged and either the second or fourth speed cannot be attained.

In view of this, if the first B-1 apply control valve 171 is placed at the right half position, the D range pressure $P_D$ is supplied, as a fail-safe hydraulic pressure, to the first B-1 apply control valve 171 through the oil passages L-11, L-23 and L-105 and further supplied to the clutch apply control valve 66 serving as fail-safe means through the oil passage L-192. As a result, the clutch apply control valve 66 is forced into the right half position and the D range pressure $P_D$ is supplied to the hydraulic servos C-1 and C-0. It is noted that each of the second B-1 apply control valve 162, the clutch apply control valve 66 and the B-2 apply control valve 167 comprises a switching valve.

In this case, the first clutch C1 and the fourth clutch C0 can be engaged, so that the automatic transmission 11 can attain the third speed. As a result, power can be surely transmitted by the automatic transmission 11 to thereby allow the travel of the vehicle.

Furthermore, after the D range pressure $P_D$ has been supplied to the B-2 apply control valve 167, the pressure $P_D$ is to be transmitted to the B-2 control valve 165 and the B-2 apply control valve 167 is positioned upstream of the sixth solenoid valve DSL, the solenoid relay valve 56 and the B-2 control valve 165 in the D range pressure $P_D$ supply system. After the D range pressure $P_D$ is supplied to the first B-1 apply control valve 171, it is to be supplied to the B-1 control valve 155. The first B-1 apply control valve 171 is positioned upstream of the first solenoid valve SL1 and the B-1 control valve 155 in the D range pressure $P_D$ supply system. It is, therefore, possible to reduce the oil leakage amount between the B-2 control valve 165 and the hydraulic servo B-2 as well as that between the B-1 control valve 155 and the hydraulic servo B-1. In addition, as no valve is disposed between the B-2 control valve 165 and the B-1 control valve 155 and between the hydraulic servos B-2 and B-1, line resistance is low. It is, therefore, possible to enhance the control characteristics of the first and sixth solenoid valves SL1 and DSL.

Next, the fourth embodiment according to the invention will be described. It is noted that the same constituent elements as those in the third embodiment are denoted by the same reference symbols and description thereof will not be given herein. FIG. 6 is used as the left half view of a hydraulic circuit in this embodiment.

Figure 8:
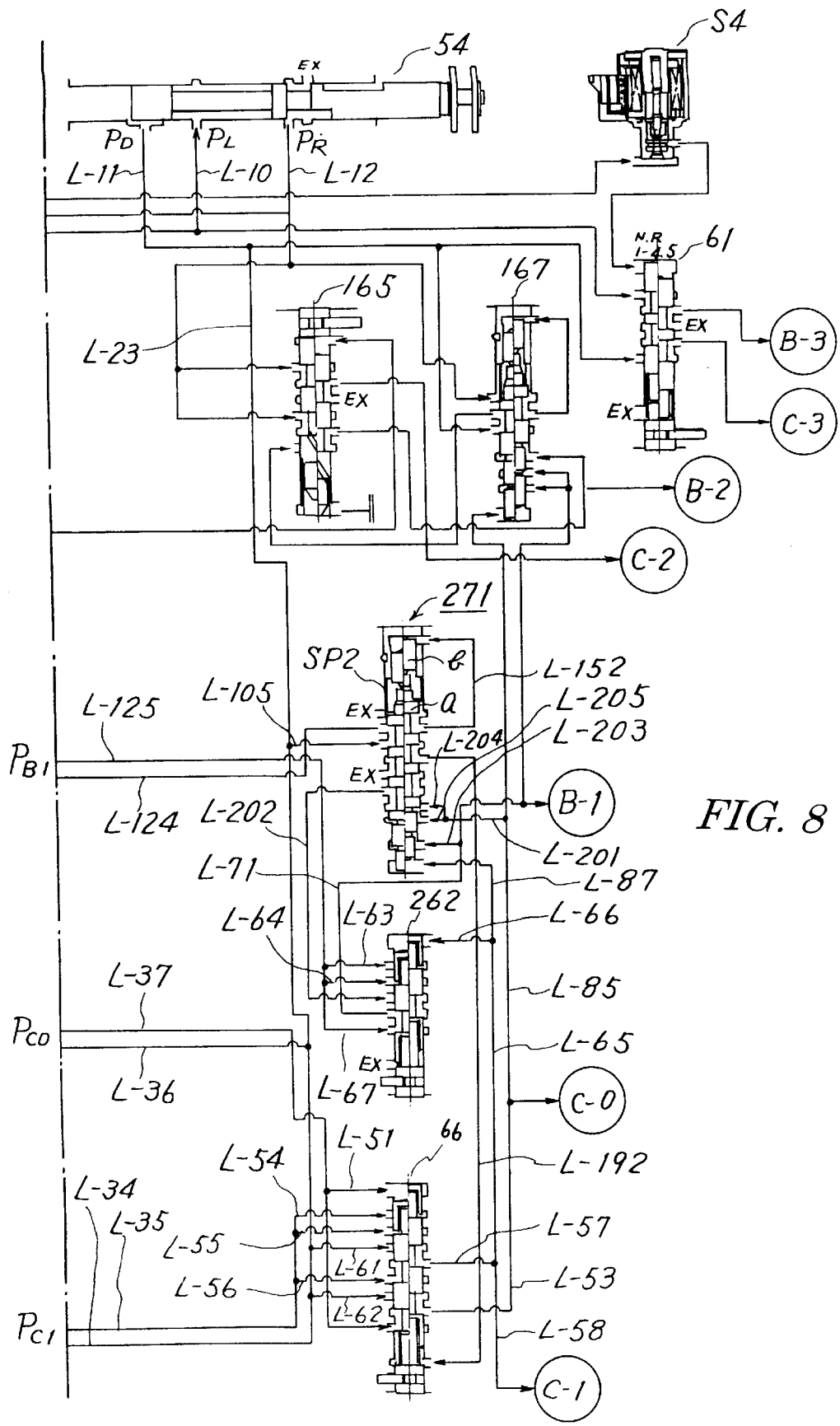
FIG. 8 is a right half view showing a hydraulic circuit in the fourth embodiment according to the invention.

FIG. 8 is a right half view showing the hydraulic circuit in the fourth embodiment according to the invention.

In this case, a first B-1 apply control valve 271 serving as a shutoff valve is provided with spools a and b and with a spring SP2 between the spools a and b. The first B-1 apply control valve 271 is normally placed at a left half position by the urging force of a spring SP2 and supplies D range pressure $P_D$, supplied thereto through oil passages L-11, L-23 and L-105, to a B-1 control valve 155 (FIG. 6) through an oil passage L-124. Since the first B-1 apply control valve 271 is placed at the left half position by the urging force of the spring SP2, the D range pressure $P_D$ supplied to the valve 271 through an oil passage L-105 acts on the valve 271 through the oil passage L-152 such that the valve 271 is placed at the left half position.

The B-1 control valve 155 is supplied with signal hydraulic pressure through an oil passage L-15, regulates the D range pressure $P_D$ supplied through an oil passage L-124, generates B-1 control pressure $P_{B1}$ and supplies the B-1 control pressure $P_{B1}$ to the second B-1 apply control valve 262 serving as fail-safe means through an oil passage 125. It is noted that the second B-1 apply control valve 262 consists of a switching valve.

Next, the second B-1 apply control valve 262 is selectively placed at a left half position as the first position and a right half position as the second position. The second B-1 apply control valve 262 is supplied either with the B-1 control pressure $P_{B1}$ through the oil passages L-125 and L-63 or the oil passages L-125 and L-64 or with hydraulic pressure (C-1 control pressure $P_{C1}$ or D range pressure $P_D$) supplied to the hydraulic servo C-1 through oil passages L-57, L-65 and L-66 to be thereby placed at the left half position and supplies the B-1 control pressure $P_{B1}$ supplied thereto through the oil passages L-125 and L-67 to the first B-1 apply control valve 271 through oil passages L-71 and L-203.

In this embodiment, the states in which the valves function are the same as those in the third embodiment. However, this embodiment differs from the third embodiment in that when the position of the second B-1 apply control valve 262 is switched to the right half position, not the B-1 control pressure $P_{B1}$ but hydraulic pressure (C-0 control pressure $P_{C0}$ or D range pressure $P_D$) supplied to the hydraulic servo C-0 is used as that supplied to the first B-1 apply control valve 271. Also, the hydraulic pressure supplied to the hydraulic servo C-0 is supplied to the first B-1 apply control valve 271 through oil passages L-85 and L-201. When the first B-1 apply control valve 271 is placed at the left half position, oil passages L-204 and L-202 are communicated with each other and the first B-1 apply control valve 271 is thereby connected to the second B-1 apply control valve 262. When the first B-1 apply control valve 271 is placed at the right half position, the communication between the oil passages L-204 and L-202 is shut off. It is noted that the reason for supplying the hydraulic pressure supplied to the hydraulic servo C-0 to the second B-1 apply control valve 262, through the first B-1 apply control valve 271, is to prevent the first clutch C1, the fourth clutch C0 and the first brake B1 from being engaged simultaneously.

Further, if the hydraulic pressure supplied to the hydraulic servo C-0 is not supplied to the second B-1 apply control valve 262 through the first B-1 apply control valve 271 and valve sticking occurs while the second B-1 apply control valve 262 is placed at the right half position at a time when the third speed is attained, then the hydraulic pressure supplied to the hydraulic servo C-0 is supplied to the hydraulic servo B-1 through an oil passage L-71. In this state, although hydraulic pressure is supplied to the respective hydraulic servos C-0, C-1 and B-1, the position of the first B-1 apply control valve 271 is switched to the right half position. Following the switching, however, the oil passage from the hydraulic servo C-0 to the hydraulic servo B-1 is not shut off. In such a case, the first brake B1 is also engaged to thereby generate interlock. In this embodiment, however, it is possible to prevent the interlock from occurring.

What is claimed is:

1. A hydraulic control device for an automatic transmission comprising:
   a plurality of friction engagement elements;
   a plurality of hydraulic servos for engaging and disengaging the friction engagement elements respectively in accordance with supply and discharge of hydraulic pressure;
   a solenoid valve for generating a predetermined hydraulic pressure and supplying the predetermined hydraulic pressure to a hydraulic servo selected in correspondence with a target gear ratio; and
   fail-safe means for supplying fail-safe hydraulic pressure to at least two hydraulic servos selected to attain an arbitrary gear ratio when a failure occurs to the solenoid valve and power transmission becomes impossible.

2. The hydraulic control device for the automatic transmission according to claim 1, wherein the fail-safe means is a switching valve.

3. The hydraulic control device for the automatic transmission according to claim 2, wherein the switching valve is placed at a first position for supplying the predetermined hydraulic pressure to the selected hydraulic servo and at a second position for supplying the fail-safe hydraulic pressure to the selected hydraulic servo.

4. The hydraulic control device for the automatic transmission according to claim 3, wherein the switching valve is disposed between the solenoid valve and a hydraulic servo supplied with the predetermined hydraulic pressure generated by the solenoid valve.

5. The hydraulic control device for the automatic transmission according to claim 2, further comprising a shutoff valve for shutting off supply of hydraulic pressure to at least one of the hydraulic servos when hydraulic pressure is generated to be supplied to the hydraulic servos other than the hydraulic servos selected in correspondence with the target gear ratio.

6. The hydraulic control device for the automatic transmission according to claim 5, wherein the shutoff valve is disposed upstream of the solenoid in an oil passage.

7. The hydraulic control device for the automatic transmission according to claim 2, further comprising a shutoff valve for shutting off supply of hydraulic pressure to at least one of the hydraulic servos when hydraulic pressure is generated to be supplied to the hydraulic servos other than a hydraulic servo selected to effect engine brake.

8. The hydraulic control device for the automatic transmission according to claim 6, wherein the shutoff valve is disposed upstream of the solenoid in an oil passage.

9. The hydraulic control device for the automatic transmission according to claim 6, wherein the shutoff valve comprises two spools.

10. A hydraulic control device for an automatic transmission, comprising:
    a plurality of friction engagement elements including at least a first brake and a second brake;
    a plurality of hydraulic servos for engaging and disengaging the friction engagement elements respectively in accordance with supply and discharge of hydraulic pressure;
    a hydraulic pressure source;
    a plurality of solenoid valves for generating predetermined hydraulic pressure upon receiving hydraulic pressure from the hydraulic pressure source and for supplying the predetermined hydraulic pressure to the hydraulic servos; and a shutoff valve, disposed between the hydraulic pressure source and one of the solenoid valves, for shutting off supply of hydraulic pressure to the one solenoid valve when hydraulic pressure to be supplied to a hydraulic servo selected in correspondence with a target gear ratio and hydraulic pressure to be supplied to other hydraulic servos are generated.

11. The hydraulic control device for the automatic transmission according to claim 10, wherein the shutoff valve is placed at an apply position for supplying the predetermined hydraulic pressure to the selected hydraulic servo and a shutoff position for shutting off the supply of hydraulic pressure to the solenoid valves and when the shutoff valve is placed at the apply position, opposite hydraulic pressure formed to oppose hydraulic pressure to be supplied to said other hydraulic servo is supplied to a control oil chamber; and when the shutoff valve is placed at the shutoff position, supply of the opposite hydraulic pressure to the control oil chamber is shut off.

12. The hydraulic control device for the automatic transmission according to claim 11, wherein an oil passage for controlling the opposite hydraulic pressure communicates with an oil passage for communicating the shutoff valve with the one solenoid valve.

13. The hydraulic control device for the automatic transmission according to claim 10, wherein the other hydraulic servos are hydraulic servos of friction engagement elements generating interlock if the friction engagement elements are to be engaged simultaneously with a friction engagement element of the hydraulic servo selected in correspondence with the target gear ratio.

14. The hydraulic control device for the automatic transmission according to claim 10, comprising a shutoff valve for shutting off the supply of hydraulic pressure to at least one of the hydraulic servos when hydraulic pressure is generated to be supplied to the hydraulic servos other than the hydraulic servo selected in correspondence with the target gear ratio.

15. The hydraulic control device for the automatic transmission according to claim 14, wherein the shutoff valve is an apply control valve for supplying hydraulic pressure to a hydraulic servo of the first brake.

16. The hydraulic control device for the automatic transmission according to claim 10, comprising a shutoff valve for shutting off the supply of hydraulic pressure to at least one of the hydraulic servos when hydraulic pressure is generated to be supplied to the hydraulic servos other than a hydraulic servo selected to effect engine brake.

17. The hydraulic control device for the automatic transmission according to claim 16, wherein said shutoff valve is an apply control valve for supplying hydraulic pressure to a hydraulic servo of the second brake.

18. The hydraulic control device for the automatic transmission according to claim 10, wherein the shutoff valve is a first apply control valve for supplying hydraulic pressure to a hydraulic servo of a first brake and a second apply control valve for supplying hydraulic pressure to a hydraulic servo of a second brake, the second apply control valve is placed at an apply position for supplying the predetermined hydraulic pressure to a selected hydraulic servo when hydraulic pressure is supplied only to the hydraulic servo of the first brake, when hydraulic pressure is supplied only to the hydraulic servo of the second brake, when hydraulic pressure is supplied only to a hydraulic servo of a predetermined clutch and when hydraulic pressure is supplied only to the hydraulic servo of the first brake and the hydraulic servo of the predetermined clutch.

* * * * *